(12) United States Patent
Saggar et al.

(10) Patent No.: US 11,894,894 B2
(45) Date of Patent: Feb. 6, 2024

(54) NETWORK-INDICATED PRECODER SEQUENCE FOR UPLINK TRANSMISSIONS

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/151,100

(22) Filed: Jan. 15, 2021

(65) Prior Publication Data
US 2022/0231736 A1     Jul. 21, 2022

(51) Int. Cl.
*H04B 7/0456* (2017.01)
*H04L 5/00* (2006.01)

(52) U.S. Cl.
CPC ......... *H04B 7/0456* (2013.01); *H04L 5/0048* (2013.01)

(58) Field of Classification Search
CPC ... H04B 7/0456; H04B 7/0408; H04L 5/0048; H04L 1/0026; H04L 1/08; H04W 72/14; H04W 16/28
See application file for complete search history.

(56) References Cited

U.S. PATENT DOCUMENTS

| | | | |
|---|---|---|---|
| 2012/0051453 A1 | 3/2012 | Luo et al. | |
| 2012/0113898 A1 | 5/2012 | Luo et al. | |
| 2014/0254455 A1* | 9/2014 | Nikopour | H04W 72/1273 370/312 |
| 2018/0167252 A1 | 6/2018 | Wang et al. | |
| 2018/0309496 A1* | 10/2018 | Lee | H04B 7/0628 |
| 2019/0268852 A1* | 8/2019 | Ryu | H04W 56/001 |
| 2021/0036822 A1* | 2/2021 | Lyu | H04L 27/2613 |
| 2021/0176776 A1* | 6/2021 | Choi | H04L 1/0023 |
| 2021/0320771 A1* | 10/2021 | Liu | H04L 5/0048 |
| 2021/0337534 A1* | 10/2021 | Xiong | H04L 1/08 |
| 2021/0351960 A1* | 11/2021 | Huang | H04L 5/0094 |

(Continued)

OTHER PUBLICATIONS

Partial International Search Report—PCT/US2022/070129—ISA/EPO—dated May 19, 2022.

(Continued)

*Primary Examiner* — Aristocratis Fotakis
(74) *Attorney, Agent, or Firm* — QUALCOMM Incorporated

(57) ABSTRACT

Methods, systems, and devices for wireless communications are described. To indicate a precoder sequence for uplink transmissions, a base station may transmit a message to a UE that configures a sequence of at least two sets of precoding parameters. Each set of precoding parameters may correspond to an uplink message. For example, a first set of precoding parameters of the sequence may correspond to a first uplink message and a second set of precoding parameters of the sequence may correspond to a second uplink message that is subsequent to the first uplink message in a time domain. The UE may receive the message and transmit, to the base station, the first uplink message using the first set of precoding parameters and the second uplink message using the second set of precoding parameters based on the sequence of the at least two sets of precoding parameters.

30 Claims, 18 Drawing Sheets

(56) References Cited

U.S. PATENT DOCUMENTS

2021/0367730 A1* 11/2021 Chen ................... H04L 5/0051
2021/0385832 A1* 12/2021 Zhang ............... H04W 72/1263
2022/0022141 A1*  1/2022 Cirik .................... H04W 72/14
2022/0060998 A1*  2/2022 Khoshnevisan ...... H04W 72/04
2022/0393823 A1* 12/2022 Fan ...................... H04L 5/0048

OTHER PUBLICATIONS

International Search Report and Written Opinion—PCT/US2022/070129—ISA/EPO—dated Jul. 11, 2022.

* cited by examiner

NETWORK-INDICATED PRECODER SEQUENCE FOR UPLINK TRANSMISSIONS

FIELD OF TECHNOLOGY

The following relates to wireless communications, including a network-indicated precoder sequence for uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, communication devices may support precoding of transmissions, such as codebook-based precoding or non-codebook-based precoding of uplink transmissions. In some cases, a base station may indicate to a UE one or more precoding parameters to use for a corresponding uplink transmission. However, frequent signaling of the one or more precoding parameters may result in signaling overhead in the system, particularly in cases where a UE is a reduced capability UE (e.g., industrial wireless sensors, video surveillance cameras, smart-watches, or other low-complexity and low-bandwidth devices).

SUMMARY

The described techniques relate to improved methods, systems, devices, and apparatuses that support a network-indicated precoder sequence for uplink transmissions. Generally, the described techniques provide for indicating a sequence of sets of precoding parameters to use when communicating a corresponding set of uplink messages. For example, a base station and a user equipment (UE) may support precoding of uplink transmissions to communicate different data streams from different antennas with independent beam weights such that link throughput is maximized, directional beams are formed in a particular manner, or the like. A base station may configure a sequence of at least two sets of precoding parameters, for example, based on one or more sounding reference signals (SRS) previously transmitted in one or more uplink messages. The base station may transmit a message to the UE that indicates (e.g., configures) the sequence of the at least two sets of precoding parameters. Each set of precoding parameters of the sequence may correspond to a respective uplink transmission. For example, a first set of precoding parameters of the sequence may correspond to a first uplink message and a second set of precoding parameters of the sequence may correspond to a second uplink message that is subsequent to the first uplink message in a time domain. The UE may receive the message and may transmit a set of uplink messages according to the sequence. For example, the UE may transmit, to the base station, the first uplink message using the first set of precoding parameters and the second uplink message using the second set of precoding parameters based on the sequence.

A method for wireless communication at a UE is described. The method may include receiving a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and transmitting, based on the sequence of the at least two sets of precoding parameters, the first uplink message using the first set of precoding parameters and the second uplink message using the second set of precoding parameters.

An apparatus for wireless communication at a UE is described. The apparatus may include a processor, memory in electronic communication with the processor, and instructions stored in the memory. The instructions may be executable by the processor to cause the apparatus to receive a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and transmit, based on the sequence of the at least two sets of precoding parameters, the first uplink message using the first set of precoding parameters and the second uplink message using the second set of precoding parameters.

Another apparatus for wireless communication at a UE is described. The apparatus may include means for receiving a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and means for transmitting, based on the sequence of the at least two sets of precoding parameters, the first uplink message using the first set of precoding parameters and the second uplink message using the second set of precoding parameters.

A non-transitory computer-readable medium storing code for wireless communication at a UE is described. The code may include instructions executable by a processor to receive a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and transmit, based on the sequence of the at least two sets of precoding parameters, the first uplink message using the first set of precoding parameters and the second uplink message using the second set of precoding parameters.

Some examples of the method, apparatuses, and non-transitory computer-readable medium described herein may further include operations, features, means, or instructions for transmitting, prior to transmitting the first uplink message and the second uplink message, one or more SRSs in one or more uplink transmissions, where the sequence of the at least two sets of precoding parameters may be based on the one or more SRSs, where the one or more SRSs include precoded SRSs or non-precoded SRSs.

Some examples of the method, apparatuses, and non-transitory computer-readable medium described herein may further include operations, features, means, or instructions for storing a list including a set of multiple sets of precoding parameters, the list including the at least two sets of precoding parameters.

In some examples of the method, apparatuses, and non-transitory computer-readable medium described herein, the message indicates which sets of precoding parameters from the set of multiple sets of precoding parameters from the list may be included in the sequence.

In some examples of the method, apparatuses, and non-transitory computer-readable medium described herein, the list includes a list of a previous N sets of precoding parameters used by the UE, and N may be a network-configured positive integer.

Some examples of the method, apparatuses, and non-transitory computer-readable medium described herein may further include operations, features, means, or instructions for storing a first list including sets of precoding parameters associated with narrow beam precoding and storing a second list including sets of precoding parameters associated with wide beam precoding.

Some examples of the method, apparatuses, and non-transitory computer-readable medium described herein may further include operations, features, means, or instructions for selecting, for the first uplink message, the first set of precoding parameters from the first list or the second list based on receiving the message indicating the sequence of the at least two sets of precoding parameters and selecting, for the second uplink message, the second set of precoding parameters from the first list or the second list based at least in part on receiving the message indicating the sequence of the at least two sets of precoding parameters.

In some examples of the method, apparatuses, and non-transitory computer-readable medium described herein, the message may include at least two flags associated with the at least two sets of precoding parameters, where the at least two flags indicate whether a respective set of precoding parameters is associated with the first list or the second list.

Some examples of the method, apparatuses, and non-transitory computer-readable medium may include further operations, features, means, or instructions for selecting the first set of precoding parameters from the first list based on a first flag indicating that the first set of precoding parameters may be associated with the first list and selecting the second set of precoding parameters from the second list based on a second flag indicating that the second set of precoding parameters may be associated with the second list.

Some examples of the method, apparatuses, and non-transitory computer-readable medium described herein may further include operations, features, means, or instructions for storing a mapping between the first list and the second list, where selecting the second set of precoding parameters from the second list may be based on the mapping.

In some examples of the method, apparatuses, and non-transitory computer-readable medium described herein, the first set of precoding parameters and the second set of precoding parameters include an SRI, a rank of an uplink transmission, a PMI, or a combination thereof.

Some examples of the method, apparatuses, and non-transitory computer-readable medium described herein may further include operations, features, means, or instructions for transmitting a set of uplink messages according to the sequence of the at least two sets of precoding parameters, the set of uplink messages including the first uplink message and the second uplink message.

Some examples of the method, apparatuses, and non-transitory computer-readable medium described herein may further include operations, features, means, or instructions for transmitting one or more SRSs based on receiving the message that indicates the sequence of the at least two sets of precoding parameters and receiving a second message that indicates one or more precoding parameters of the first set of precoding parameters, where transmitting the first uplink message includes transmitting the first uplink message using the one or more precoding parameters of the first set of precoding parameters indicated in the second message.

Some examples of the method, apparatuses, and non-transitory computer-readable medium described herein may further include operations, features, means, or instructions for transmitting one or more SRSs based on receiving the message that indicates the sequence of the at least two sets of precoding parameters and receiving, based on transmitting the one or more SRSs, a second message that indicates to the UE to restart a precoding parameter selection procedure, where the second message configures a channel measurement resource for the precoding parameter selection procedure or requests transmission of a non-precoded SRS.

In some examples of the method, apparatuses, and non-transitory computer-readable medium described herein, the sequence of the at least two sets of precoding parameters corresponds to a set of scheduled uplink messages, a set of configured uplink messages, or a combination thereof.

In some examples of the method, apparatuses, and non-transitory computer-readable medium described herein, the message includes a downlink control information (DCI) message that schedules or releases a dynamic uplink grant or a configured uplink grant, a DCI message responsive to one or more SRSs transmitted by the UE, a radio resource control (RRC) message, a medium access control-control element (MAC-CE) message, or a combination thereof.

A method for wireless communication at a base station is described. The method may include transmitting a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and receiving, based on the sequence of the at least two sets of precoding parameters, the first uplink message according to the first set of precoding parameters and the second uplink message according to the second set of precoding parameters.

An apparatus for wireless communication at a base station is described. The apparatus may include a processor, memory in electronic communication with the processor, and instructions stored in the memory. The instructions may be executable by the processor to cause the apparatus to transmit a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and receive, based on the sequence of the at least two sets of precoding parameters, the first uplink message according to the first set of precoding parameters and the second uplink message according to the second set of precoding parameters.

Another apparatus for wireless communication at a base station is described. The apparatus may include means for transmitting a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and means for receiving, based on the sequence of the at least two sets of precoding parameters, the first uplink message according to the first set of precoding parameters and the second uplink message according to the second set of precoding parameters.

A non-transitory computer-readable medium storing code for wireless communication at a base station is described. The code may include instructions executable by a processor to transmit a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain and receive, based on the sequence of the at least two sets of precoding parameters, the first uplink message according to the first set of precoding parameters and the second uplink message according to the second set of precoding parameters.

Some examples of the method, apparatuses, and non-transitory computer-readable medium described herein may further include operations, features, means, or instructions for receiving, prior to receiving the first uplink message and the second uplink message, one or more SRSs in one or more uplink transmissions, where the one or more SRSs include precoded SRSs or non-precoded SRSs and configuring the sequence of the at least two sets of precoding parameters based on receiving the one or more SRSs.

Some examples of the method, apparatuses, and non-transitory computer-readable medium described herein may further include operations, features, means, or instructions for identifying a list including a set of multiple sets of precoding parameters, the list including the at least two sets of precoding parameters.

Some examples of the method, apparatuses, and non-transitory computer-readable medium described herein may further include operations, features, means, or instructions for configuring the sequence of the at least two sets of precoding parameters based on selecting the at least two sets of precoding parameters from the list.

Some examples of the method, apparatuses, and non-transitory computer-readable medium described herein may further include operations, features, means, or instructions for identifying a first list including sets of precoding parameters associated with narrow beam precoding parameters and identifying a second list including sets of precoding parameters associated with wide beam precoding parameters.

In some examples of the method, apparatuses, and non-transitory computer-readable medium described herein, the message includes a first flag indicating that the first set of precoding parameters may be associated with the first list and the message includes a second flag indicating that the second set of precoding parameters may be associated with the second list.

Some examples of the method, apparatuses, and non-transitory computer-readable medium described herein may further include operations, features, means, or instructions for refraining from transmitting a second message that configures the second set of precoding parameters based on transmitting the message that indicates the sequence of the at least two sets of precoding parameters.

In some examples of the method, apparatuses, and non-transitory computer-readable medium described herein, the first set of precoding parameters and the second set of precoding parameters include an SRI, a rank of an uplink transmission, a PMI, or a combination thereof.

Some examples of the method, apparatuses, and non-transitory computer-readable medium described herein may further include operations, features, means, or instructions for receiving a set of uplink messages according to the sequence of the at least two sets of precoding parameters, the set of uplink messages including the first uplink message and the second uplink message.

Some examples of the method, apparatuses, and non-transitory computer-readable medium described herein may further include operations, features, means, or instructions for receiving one or more SRSs based on receiving the message that indicates the sequence of the at least two sets of precoding parameters, selecting one or more precoding parameters of the first set of precoding parameters based on receiving the one or more SRSs, and transmitting a second message that configures the one or more precoding parameters of the first set of precoding parameters, where receiving the first uplink message includes receiving the first uplink message according to the one or more precoding parameters of the first set of precoding parameters.

Some examples of the method, apparatuses, and non-transitory computer-readable medium described herein may further include operations, features, means, or instructions for receiving one or more SRSs based on receiving the message that indicates the sequence of the at least two sets of precoding parameters and transmitting, based on receiving the one or more SRSs, a second message that indicates a restart to a precoding parameter selection procedure, where the second message configures a channel measurement resource for the precoding parameter selection procedure or requests transmission of a non-precoded SRS.

In some examples of the method, apparatuses, and non-transitory computer-readable medium described herein, the sequence of the at least two sets of precoding parameters corresponds to a set of scheduled uplink messages, a set of configured uplink messages, or a combination thereof.

In some examples of the method, apparatuses, and non-transitory computer-readable medium described herein, the message includes a DCI message that schedules or releases a dynamic uplink grant or a configured uplink grant, a DCI message responsive to one or more SRSs transmitted by the UE, an RRC message, a MAC-CE message, or a combination thereof.

DETAILED DESCRIPTION

Figure 1:
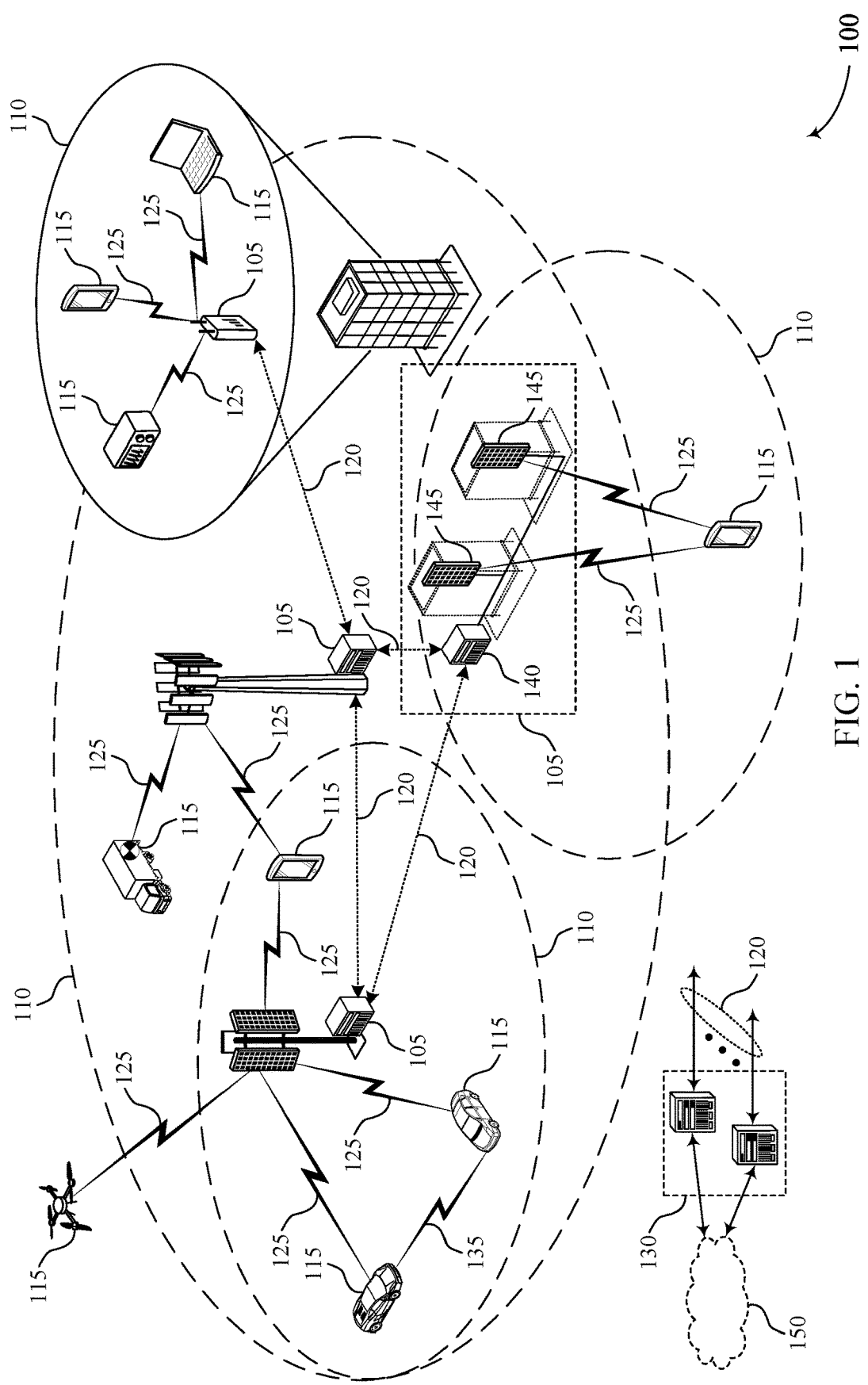
FIGS. 1, 2A, and 2B illustrate examples of wireless communications systems that support a network-indicated precoder sequence for uplink transmissions in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, a UE and a base station may support precoding of uplink transmissions (e.g., codebook-based precoding, non-codebook-based precoding) to communicate different data streams from different antennas with independent beam weights such that link throughput satisfies some threshold (e.g., maximized), directional beams are formed in a particular manner, or the like. For example, the base station may transmit a message to the UE indicating one or more precoding parameters precoding to use for a corresponding uplink message.

In some cases, it may be desirable to reduce signaling overhead associated with indicating precoding parameters to the UE. For example, a reduced capability UE may be a low-complexity and low bandwidth device such as industrial wireless sensors, video surveillance cameras, smartwatches, or medical monitoring devices, among other low-complexity and low bandwidth devices. Reducing signaling overhead for such a device may ensure relatively high throughput and low-latency communications. Additionally, signaling from such devices may be periodic in nature, and the channel conditions associated with the periodic signaling may not significantly change from one transmission to the next. Thus, it may be relatively inefficient to indicate precoding parameters for every uplink message.

Techniques, systems, and devices are described herein to indicate a sequence of sets of precoding parameters to reduce signaling overhead and latency associated with precoding of uplink transmissions. For example, channel conditions associated with reduced capability UEs may be repetitive and predictable. Accordingly, a base station may configure a sequence of at least two sets of precoding parameters for a UE to use over a corresponding quantity of uplink messages, which may be based on a periodicity or predictability of the UE's transmissions. For example, based on one or more previously transmitted sounding reference signals (SRS), the base station may determine the sequence and may transmit a message to the UE indicating the sequence. The UE may receive the message and may transmit uplink messages using the corresponding sets of precoding parameters.

Each set of precoding parameters of the sequence may correspond to an uplink message. For example, a first set of precoding parameters of the sequence may correspond to a first uplink message, and a second set of precoding parameters of the sequence may correspond to a second uplink message that is subsequent to the first uplink message in a time domain. Accordingly, the UE may transmit the first uplink message using first set of precoding parameters and the second uplink message using the second set of precoding parameters based on the sequence.

Aspects of the subject matter described in this disclosure may be implemented to realize one or more of the following potential improvements, among others. The techniques employed by the UE and the base station may provide benefits and enhancements to the operation of the UE and the base station. For example, operations performed by the UE and the base station may provide improvements to precoding uplink transmissions. In some examples, receiving, from the base station, a message indicating a sequence of sets of precoding parameters may reduce signaling overhead associated with indicating precoding parameters. In some other examples, the base station indicating the sequence of sets of precoding parameters may provide improvements to latency, power consumption, spectral efficiency, and, in some examples, may promote highly reliable communications, among other benefits.

Aspects of the disclosure are initially described in the context of wireless communications systems. Aspects of the disclosure are additionally described in the context of communication sequences and a precoder mapping. Aspects of the disclosure are further illustrated by and described with reference to apparatus diagrams, system diagrams, and flowcharts that relate to network-indicated precoder sequence for uplink transmissions.

FIG. 1 illustrates an example of a wireless communications system 100 that supports network-indicated precoder sequence for uplink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. In some examples, the wireless communications system 100 may support precoder sequences for reducing signaling overhead when indicating precoding parameters to a UE 115.

The base stations 105 may be dispersed throughout a geographic area to form the wireless communications system 100 and may serve devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low-cost or low-complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some examples, low-complexity devices may be referred to as reduced capability (or REDCAP) devices or UEs 115. Such devices may be configured to transmit relatively more uplink messages when compared to downlink messages, where the uplink messages may correspond to a configured function or process performed by the device to convey information to the base station 105. For example, industrial wireless sensors (e.g., in-factory sensors) may monitor pressure, temperature, humidity, and motion, and may function as accelerometers or actuators, among other functions. Industrial wireless sensors may be considered uplink heavy devices that transmit uplink messages at a data rate of a few megabits per second and may have a battery life of one or more years. Additionally, other devices may be referred to as smart city devices (e.g., video surveillance cameras, smart meters, traffic cameras, or some other smart city device) and may be considered uplink dominated devices that receive relatively few downlink messages and transmit uplink messages at data rates of tens of megabits per second. Further, wearable devices (e.g., smart watches, smart rings, eHealth devices, wearable medical monitoring devices, or some other wearable device) may transmit uplink messages and receive downlink messages at similar rates and may have battery lives of one or more weeks.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). Precoding may refer to any digital signal processing technique at the transmitter that uses channel state information to allow transmission of one or more layers of information at the same time using multiple antennas. Radio frequency beamforming may refer to any digital or analog method that makes a radio transmission directional. The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or un-precoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support precoding of uplink transmissions (e.g., codebook-based precoding, non-codebook-based precoding). For example, a UE 115 and a base station 105 may support the precoding of uplink transmissions to communicate different data streams from different antennas with independent beam weights such that link throughput is maximized, directional beams are formed in a particular manner, or the like. In some cases, it may be desirable to reduce signaling overhead associated with the precoding of uplink transmissions.

Various aspects of the described techniques support network indicated sequences of precoding parameters for uplink transmissions to reduce signaling overhead associated with the precoding of uplink transmissions. For example, a base station 105 may configure a sequence of at least two sets of precoding parameters for a UE 115 to use over a corresponding quantity of uplink messages. For example, based on one or more previously transmitted SRSs, the base station 105 may determine the sequence and may transmit a message to the UE 115 that indicates (e.g., configures) the sequence. The UE 115 may receive the message and may transmit uplink messages using the corresponding sets of precoding parameters.

Each set of precoding parameters of the sequence may correspond to an uplink message. For example, a first set of precoding parameters of the sequence may correspond to a first uplink message, and a second set of precoding parameters of the sequence may correspond to a second uplink message that is subsequent to the first uplink message in a time domain. Accordingly, the UE 115 may transmit the first uplink message using first set of precoding parameters and the second uplink messages using the second set of precoding parameters based on the sequence. In this way, the base station 105 may indicate multiple sets of precoding parameters to use over a quantity of uplink transmissions rather than indicating precoding parameters for every uplink transmission, thereby reducing signaling overhead and latency and increasing throughput associated with the precoding of uplink transmissions.

Figure 2A:
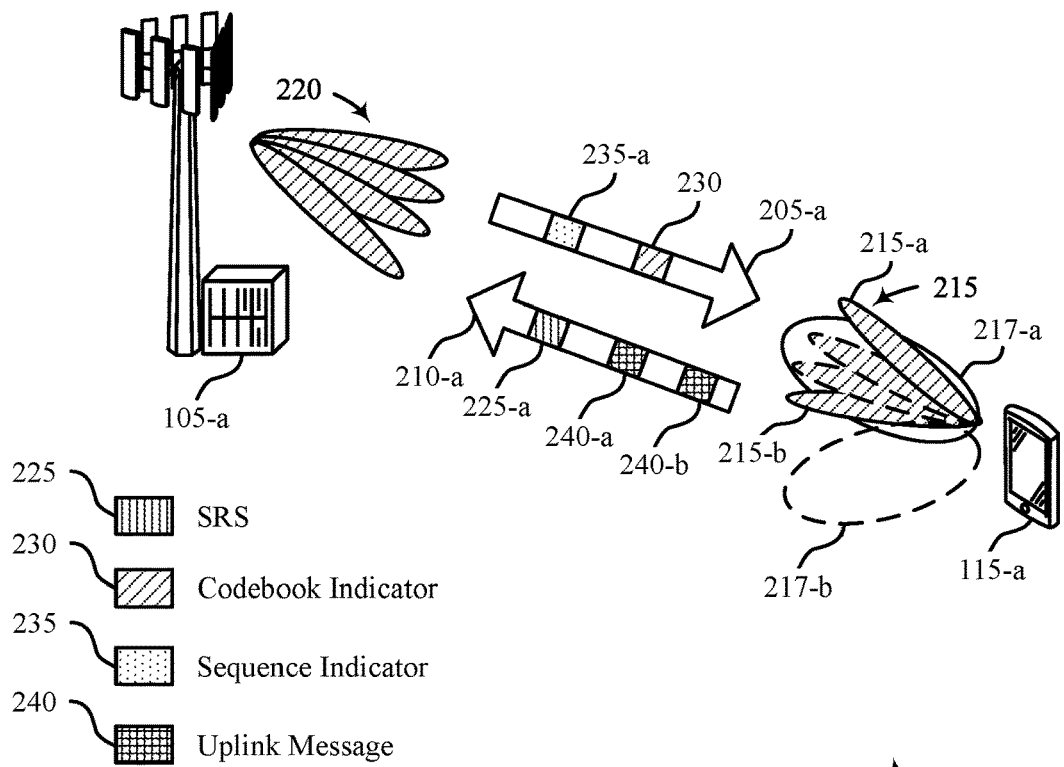

FIG. 2A illustrates an example of a wireless communications system 200-a that supports a network-indicated precoder sequence for uplink transmissions in accordance with aspects of the present disclosure. In some examples, the wireless communications system 200-a may implement aspects of the wireless communications system 100. For example, the wireless communications system 200-a may include a base station 105-a and a UE 115-a, which may be examples of a base station 105 and a UE 115 as described with reference to FIG. 1. In some examples, the wireless communications system 200-a may support one or more RATs including 4G systems such as LTE systems, LTE-Advanced (LTE-A) systems, or LTE-A Pro systems, 5G systems which may be referred to as NR systems, or a combination of these or other RATs. In some cases, the base station 105-a may implement a sequence indicator 235, and the UE 115-a may transmit uplink messages 240 (e.g., messages over a physical uplink shared channel (PUSCH), messages over a physical uplink control channel (PUCCH)) based on the sequence indicator 235 to reduce signaling associated with precoding the uplink messages 240.

The base station 105-a and the UE 115-a may communicate using a downlink channel 205-a and an uplink channel 210-a. For example, the UE 115-a may transmit uplink messages to the base station 105-a via the uplink channel 210-a and may receive downlink messages from the base station 105-a via the downlink channel 205-a. Additionally, the UE 115-a and the base station 105-a may support directional communications using sets of communication beams. For example, the UE 115-a may transmit uplink transmissions to the base station 105-a via the uplink channel 210-a using one or more precoded UE communication beams 215 (e.g., UE transmit beams) of a set of precoded UE communication beams 215 and may receive downlink transmissions from the base station 105-a via the downlink channel 205-a using one or more precoded UE communication beams 215 (e.g., UE receive beams) of the set of precoded UE communication beams 215. Additionally, the base station 105-a may receive uplink transmissions from the UE 115-a via the uplink channel 210-a using one or more base station communication beams 220 (e.g., base station receive beams) of a set of base station communication beams 220 and may transmit downlink transmissions via the downlink channel 205-a using one or more base station communication beams 220 (e.g., base station transmit beams) of the set of base station communication beams 220.

The wireless communications system 200-a may illustrate an example of codebook-based precoder sequence indication. To communicate according to a codebook-based transmission scheme, the UE 115-a may transmit one or more non-precoded (e.g., un-precoded) SRSs 225 to the base station 105-a using one or more analog beams 217 (e.g., analog beam 217-a and analog beam 217-b). For example, for each analog beam 217, the UE 115-a may transmit a non-precoded SRS 225 (e.g., SRS 225-a) to the base station 105-a. In some examples, the UE 115-a may be configured to transmit SRSs aperiodically and an SRS request field in a downlink control information (DCI) message transmitted by the base station 105-a may trigger transmission of the non-precoded SRSs 225. The base station 105-a may receive the one or more SRSs 225 and may select an analog beam 217 for the UE 115-*a* to use based on the received SRSs 225. For example, the base station 105-*a* may measure channel conditions or channel quality of an analog beam 217 using the SRS 225 transmitted on the analog beam 217 (e.g., based on a signal-to-interference-plus-noise ratio (SINR) indicated by the SRS 225). In the example of FIG. 2A, the base station 105-*a* may select the analog beam 217-*a* that may be associated with comparatively better channel conditions.

The base station 105-*a* may indicate the selected analog beam 217-*a* to the UE 115-*a* via a codebook indicator 230. The codebook indicator 230 may additionally indicate a set of precoding parameters to use for a corresponding uplink message 240 transmitted using a precoded UE communication beam 215. For example, the codebook indicator 230 may include an SRS resource indicator (SRI) to indicate the selected analog beam 217 (e.g., analog beam 217-*a*), a number of spatial layers or rank of a corresponding uplink message, a Transmitted Precoding Matrix Indicator (TPMI), or a combination thereof. The UE 115-*a* may use the TPMI and the indication of the number of spatial layers or rank to determine which precoded UE communication beams 215 (e.g., precoded UE communication beam 215-*a* and precoded UE communication beam 215-*b*) corresponding to the analog beam 217-*a* to use to transmit uplink messages. In some cases, the TPMI may indicate a precoder to be applied over a set of spatial layers. In some examples, the base station 105-*a* may transmit the codebook indicator 230 in a DCI message (e.g., a message that includes DCI) that schedules a corresponding uplink message 240, an RRC message, a MAC-control element message, or a combination thereof.

In some cases, the base station 105-*a* may transmit the codebook indicator 230 prior to every uplink message transmitted by the UE 115-*a*. But transmitting the codebook indicator 230 prior to every uplink message 240 may increase signaling overhead and latency associated with codebook-based precoding of uplink messages 240.

To reduce signaling overhead and latency and to increase throughput associated with codebook-based precoding uplink messages 240, the base station 105-*a* may configure a sequence or pattern of at least two sets of precoding parameters to use over a corresponding quantity of uplink messages 240. For example, channel conditions associated with the uplink channel 210-*a* may be relatively repetitive or predictable (e.g., if the UE 115-*a* is a reduced capability UE). For example, uplink messages transmitted by one or more UEs (e.g., including the UE 115-*a*) may be relatively periodic, and the channel conditions associated with the uplink channel 210-*a* may likewise be relatively periodic. Accordingly, the base station 105-*a* may configure the sequence and may transmit a sequence indicator 235-*a* that indicates the sequence to the UE 115-*a*. In some examples, the sequence indicator 235-*a* may include multiple codebook indicators 230. That is, the sequence indicator 235-*a* may include at least two codebook indicators 230 that each indicate a corresponding set of precoding parameters and optionally a corresponding analog beam 217 to use to transmit a corresponding uplink message 240. In some examples, the base station 105-*a* may transmit the sequence indicator 235-*a* in a DCI message that schedules or releases a dynamic uplink grant or a configured uplink grant, a DCI message responsive to the set of SRSs 225 transmitted by the UE 115-*b*, an RRC message, a MAC-control element (MAC-CE) message, or a combination thereof.

The UE 115-*a* may receive the sequence indicator 235-*a* and may transmit uplink messages 240 according to the sequence. Each set of precoding parameters of the sequence may correspond to an uplink message 240. For example, a first set of precoding parameters of the sequence may correspond to a first uplink message 240-*a*, and a second set of precoding parameters of the sequence may correspond to a second uplink message 240-*b* that is subsequent to the first uplink message 240-*a* in a time domain. Accordingly, the UE 115-*a* may transmit the first uplink message 240-*a* using first set of precoding parameters and the second uplink message 240-*b* using the second set of precoding parameters according to the sequence. In some examples, the UE 115-*a* may apply the sequence to a set of scheduled uplink messages, a set of configured uplink messages, or a combination thereof.

Figure 2B:
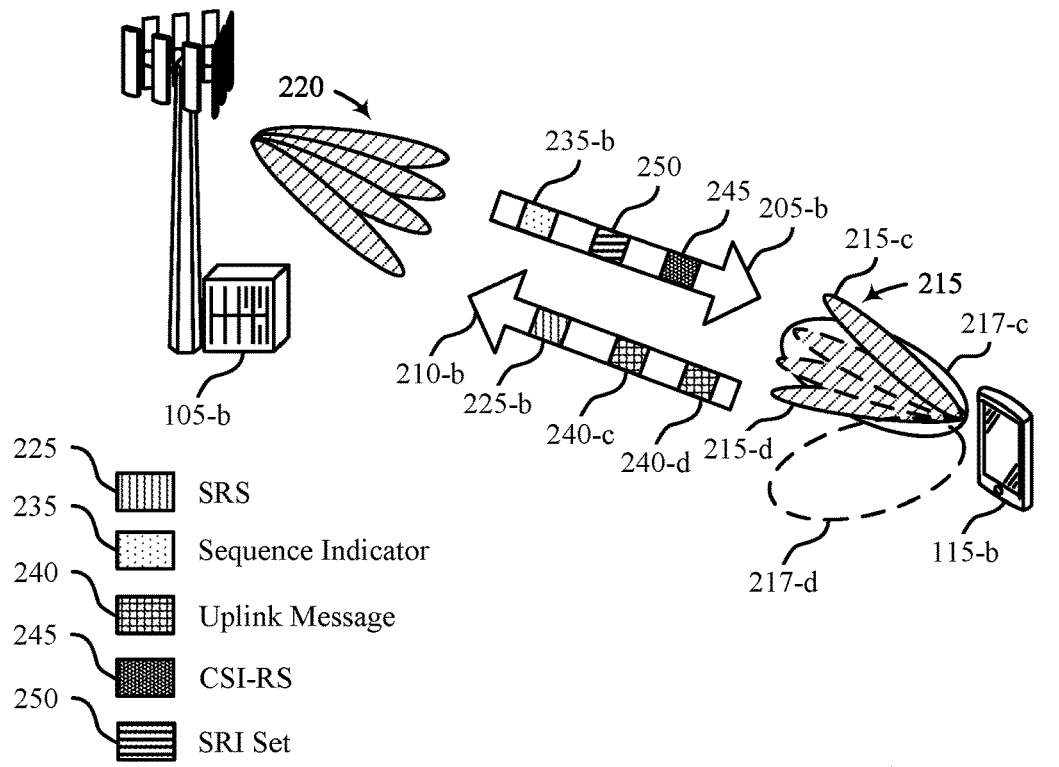

FIG. 2B illustrates an example of a wireless communications system 200-*b* that supports a network-indicated precoder sequence for uplink transmissions in accordance with aspects of the present disclosure. In some examples, the wireless communications system 200-*b* may implement aspects of the wireless communications system 100. For example, the wireless communications system 200-*b* may include a base station 105-*b* and a UE 115-*b*, which may be examples of a base station 105 and a UE 115 as described with reference to FIG. 1. In some examples, the wireless communications system 200-*b* may support one or more RATs including 4G systems such as LTE systems, LTE-A systems, or LTE-A Pro systems, 5G systems which may be referred to as NR systems, or a combination of these or other RATs. In some cases, the base station 105-*b* may implement a sequence indicator 235, and the UE 115-*b* may transmit uplink messages 240 (e.g., PUSCH messages, PUCCH messages) based on the sequence indicator 235 to reduce signaling associated with precoding the uplink messages 240.

The base station 105-*b* and the UE 115-*b* may communicate using a downlink channel 205-*b* and an uplink channel 210-*b*. For example, the UE 115-*b* may transmit uplink messages to the base station 105-*b* via the uplink channel 210-*b* and may receive downlink messages from the base station 105-*b* via the downlink channel 205-*b*. Additionally, the UE 115-*b* and the base station 105-*b* may support directional communications using sets of communication beams. For example, the UE 115-*b* may transmit uplink transmissions to the base station 105-*b* via the uplink channel 210-*b* using one or more precoded UE communication beams 215 (e.g., UE transmit beams) of a set of precoded UE communication beams 215 and may receive downlink transmissions from the base station 105-*b* via the downlink channel 205-*b* using one or more precoded UE communication beams 215 (e.g., UE receive beams) of the set of precoded UE communication beams 215. Additionally, the base station 105-*b* may receive uplink transmissions from the UE 115-*b* via the uplink channel 210-*b* using one or more base station communication beams 220 (e.g., base station receive beams) of a set of base station communication beams 220 and may transmit downlink transmissions via the downlink channel 205-*b* using one or more base station communication beams 220 (e.g., base station transmit beams) of the set of base station communication beams 220.

The wireless communications system 200-*b* may illustrate an example of non-codebook-based precoder sequence indication. To communicate according to a non-codebook-based transmission scheme, the base station 105-*b* may transmit one or more CSI-RSs 245 to the UE 115-*b* (e.g., using one or more base station communication beams 220), and the UE 115-*b* may measure channel conditions using the one or more CSI-RSs 245. In some examples, the UE 115-*a* may be configured to transmit SRSs aperiodically and an SRS request field in a DCI message transmitted by the base station 105-*a* may indicate the presence of the one or more CSI-RSs 245. Based on the measured channel conditions, the UE 115-*b* may determine an analog beam 217 (e.g., analog beam 217-*c*) and a corresponding quantity of spatial layers and sets of precoding parameters for transmitting a set of SRSs 225.

In some examples, the sets of precoding parameters may include a precoding matrix associated with the SRS 225, a number of spatial layers, or a combination thereof. The UE 115-*b* may transmit the set of precoded SRSs 225 (e.g., SRS 225-*b*) on the set of precoded UE communication beams 215 using the determined precoding parameters for each spatial layer. The base station 105-*b* may measure the set of precoded SRSs 225 and may select a subset of the set of precoded UE communication beams 215 for the UE 115-*b* to use based on the measurement. In the example FIG. 2B, the base station 105-*b* may select the precoded UE communication beam 215-*c* and the precoded UE communication beam 215-*d* based on, for example, a measured SINR associated with the precoded UE communication beam 215-*c* and the precoded UE communication beam 215-*d*.

The base station 105-*b* may indicate the selected precoded UE communication beams 215 via a set of SRIs 250. For example, the base station 105-*b* may transmit the SRI set 250 that indicates which spatial layers (e.g., the subset of precoded UE communication beams 215) the UE 115-*b* may use to transmit one or more corresponding uplink messages 240. In some examples, the base station 105-*b* may transmit the SRI set 250 in a DCI message that schedules a corresponding uplink message 240, an RRC message, a MAC-control element message, or a combination thereof.

In some cases, the base station 105-*b* may periodically transmit the CSI-RS 245, and the UE 115-*b* may periodically transmit the set of SRSs 225. Alternatively, the base station 105-*b* may transmit the CSI-RS 245 on-demand, and the UE 115-*b* may transmit the set of SRSs 225 on-demand. However, in some cases, the base station 105-*b* may transmit the SRI set 250 prior to every uplink message 240 transmitted by the UE 115-*b*. But transmitting the SRI set 250 prior to every uplink message 240 may increase signaling overhead and latency associated with non-codebook-based precoding of uplink messages 240.

To reduce signaling overhead and latency and to increase throughput associated with non-codebook-based precoding of uplink messages 240, the base station 105-*b* may configure a sequence (or pattern) of at least two sets of precoding parameters to use over a corresponding quantity of uplink messages 240. For example, channel conditions associated with the uplink channel 210-*a* may be relatively repetitive or predictable (e.g., if the UE 115-*b* is a reduced capability UE). Accordingly, the base station 105-*b* may configure the sequence and may transmit a sequence indicator 235-*b* that indicates the sequence to the UE 115-*a*. In some examples, the sequence indicator 235-*b* may include multiple SRI sets 250. That is, the sequence indicator 235-*b* may include at least two SRI sets 250 that each indicate a corresponding set of precoding parameters to use to transmit a corresponding uplink message 240. In some examples, the base station 105-*b* may transmit the sequence indicator 235-*b* in a DCI message that schedules or releases a dynamic uplink grant or a configured uplink grant, a DCI message responsive to an SRS 225 transmitted by the UE 115-*a*, an RRC message, a MAC-CE message, or a combination thereof.

The UE 115-*b* may receive the sequence indicator 235-*b* and may transmit uplink messages 240 according to the sequence. Each set of precoding parameters of the sequence may correspond to an uplink message 240. For example, a first set of precoding parameters of the sequence may correspond to a first uplink message 240-*c*, and a second set of precoding parameters of the sequence may correspond to a second uplink message 240-*d* that is subsequent to the first uplink message 240-*c* in a time domain. Accordingly, the UE 115-*b* may transmit the first uplink message 240-*c* using first set of precoding parameters and the second uplink message 240-*d* using the second set of precoding parameters according to the sequence. In some examples, the UE 115-*b* may apply the sequence to a set of scheduled uplink messages, a set of configured uplink messages, or a combination thereof.

Figure 3:
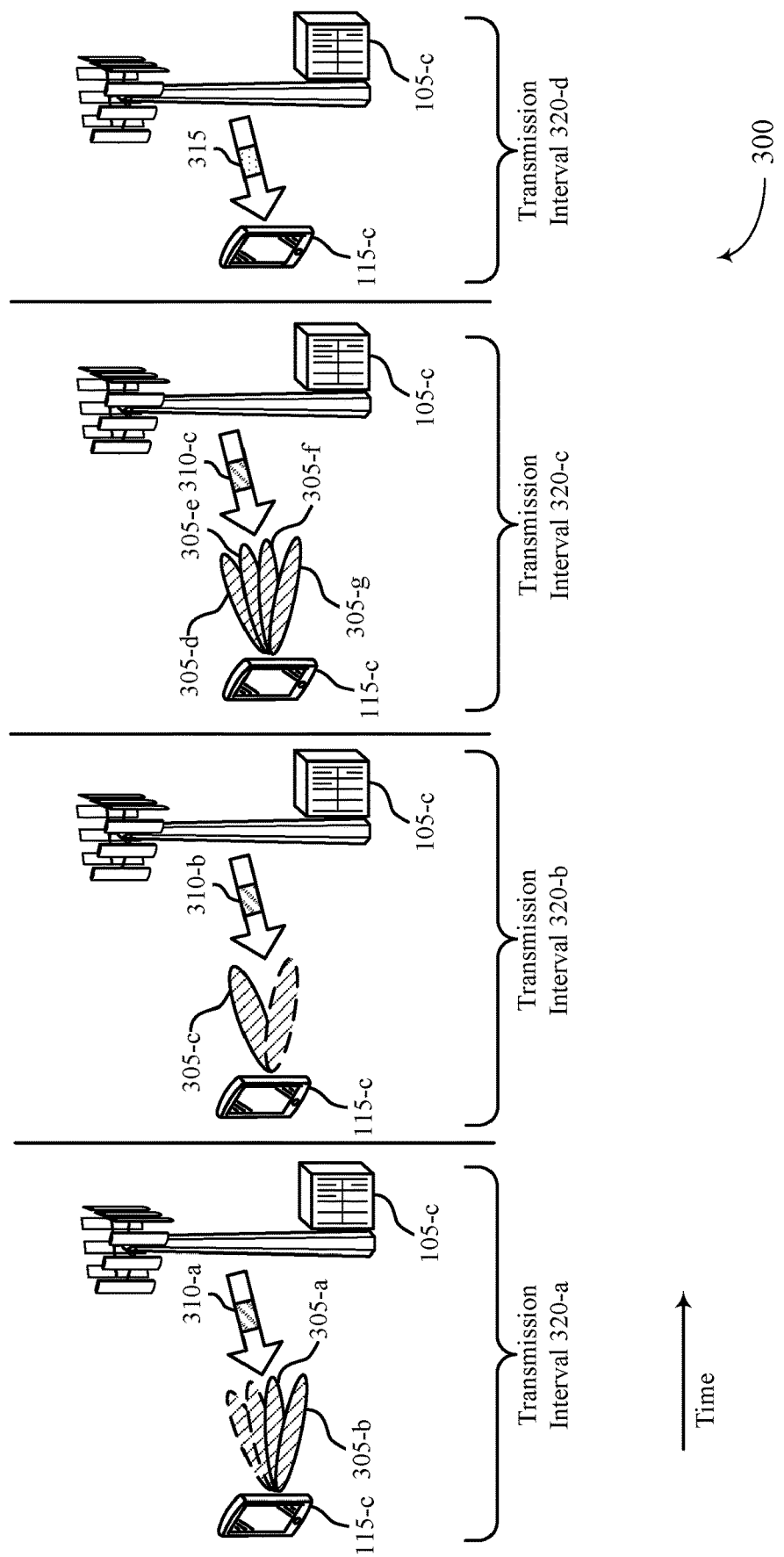
FIG. 3 illustrates an example of a communication sequence that supports a network-indicated precoder sequence for uplink transmissions in accordance with aspects of the present disclosure.

FIG. 3 illustrates an example of a communication sequence 300 that supports network-indicated precoder sequence for uplink transmissions in accordance with aspects of the present disclosure. In some examples, the communication sequence 300 may implement aspects of the wireless communications systems 100, 200-*a*, and 200-*b*, as respectively described with reference to FIGS. 1 through 2B. For example, the communication sequence 300 may depict a base station 105-*c* and a UE 115-*c*, which may be examples of a base station 105 and a UE 115 as described with reference to FIGS. 1, 2A, and 2B. The communication sequence 300 may illustrate a series of transmission intervals 320 between the base station 105-*c* and the UE 115-*c* in a time domain.

The base station 105-*c* and the UE 115-*c* may support codebook-based and non-codebook-based precoding of uplink transmission, as described herein. For example, the UE 115-*c* may transmit uplink messages and receive downlink messages using one or more UE communication beams 305. The base station 105-*c* may transmit a precoding indicator 310 (e.g., a codebook indicator 230, an SRI set 250) to the UE 115-*c* to indicate a set of precoding parameters to use for a corresponding uplink message.

The base station 105-*c* may configure a sequence of at least two sets of precoding parameters to use over a corresponding quantity of uplink messages or transmission intervals 320 based on one or more previously transmitted uplink messages. For example, the UE 115-*c* may generate and store a list of N past sets of precoding parameters used to transmit uplink messages, where N is some network-configured positive integer. The base station 105-*c* may identify the list and select the at least two sets of precoding parameters from the list to configure the sequence. In some examples, the UE 115-*d* may generate and store a list of unique sets of precoding parameters from which the base station 105-*c* may select to configure the sequence. In some cases, the list may be a combination of unique sets of precoding parameters and past sets of precoding parameters used to transmit uplink messages.

For example, the UE 115-*c* and the base station 105-*c* may communicate according to a codebook-based or a non-codebook-based precoding scheme for a transmission interval 320-*a*, a transmission interval 320-*b*, and a transmission interval 320-*c*. In the example of FIG. 3, the base station 105-*c* may transmit a precoding indicator 310-*a* to the UE 115-*c* indicating that the UE 115-*c* use a precoded UE communication beam 305-*a* and a precoded UE communication beam 305-*b* to transmit an uplink message in each beam according to a set of corresponding precoding parameters. The UE 115-*c* may transmit, during the transmission interval 320-*a*, a first uplink message using the precoded UE communication beam 305-*a* and a second uplink message uplink message using the precoded UE communication beam 305-*b*. The UE 115-*c* may generate a list and store a first set of precoding parameters used to transmit the first uplink message and a second set of precoding parameters used to transmit the second uplink message in the list. A similar process may be repeated for transmission interval 320-b and transmission interval 320-c. For example, based on the precoding indicator 310-b, the UE 115-c may transmit, during the transmission interval 320-b, a third uplink message using a precoded UE communication beam 305-c and may store a third set of precoding parameters used to transmit the third uplink message in the list. Then, based on a precoding indicator 310-c, the UE 115-c may transmit, during the transmission interval 320-c, a fourth uplink message using a precoded UE communication beam 305-d, a fifth uplink message using a precoded UE communication beam 305-e, a sixth uplink message using a precoded UE communication beam 305-f, and a seventh uplink message using a precoded UE communication beam 305-g. The UE 115-c may store, in the list, a fourth set of precoding parameters used to transmit the fourth uplink message, a fifth set of precoding parameters used to transmit the fifth uplink message a sixth set of precoding parameters used to transmit the sixth uplink message, and a seventh set of precoding parameters used to transmit the seventh uplink message.

During transmission interval 320-d, the base station 105-c may transmit a sequence indicator 315 to the UE 115-c based on the uplink messages transmitted during transmission intervals 320-a, 320-b, and 320-c. For example, the sequence indicator 315 may indicate a sequence of at least two sets of precoding parameters to use to transmit uplink messages during a subsequent three transmission intervals 320. The at least two sets of precoding parameters may correspond to sets of precoding parameters used during prior transmissions (e.g., during the transmission intervals 320-a, 320-b, and 320-c). In some examples, the base station 105-c may configure the sequence such that sets of precoding parameters used to transmit uplink messages during a first subsequent transmission interval 320 (e.g., a transmission interval 320 that is after transmission interval 320-d in the time domain) correspond to one or more sets of precoding parameters used during the transmission interval 320-a; sets of precoding parameters used to transmit uplink messages during a second subsequent transmission interval 320 after the first subsequent transmission interval 320 correspond to one or more sets of precoding parameters used to transmit uplink messages during the transmission interval 320-b; and so on. In some other examples, the base station 105-c may select one or more of any set of precoding parameters stored in the list to configure the sequence. In some examples, the sequence may be applied one time. In some other examples, the base station 105-c may indicate that the sequence repeats a number of times and is to be applied more than once. In some examples, the sequence may be repeated a threshold number of times by the UE 115-c.

In some examples, the indication of the sequence or pattern provided by sequence indicator 315 may have the form: precoderPattern=[Tx=4, precoder=[0, 1], Tx=5, precoder=[5], Tx=6, precoder=[6, 7]], where the Tx value may correspond to a respective transmission (e.g., a transmission of a first message at a first transmission time, a transmission of a second message at a second transmission time after the first transmission time, and so forth). In addition, the numerical values for precoder may indicate, for each transmission (e.g., Tx), the precoding parameters to use during the transmission, which may, for example, be represented by a unique index value. Thus, the UE 115-c may receive the sequence indicator 315 and determine that a fourth transmission (e.g., Tx=4) may use respective precoders (e.g., sets of precoding parameters) indexed by 0 and 1, whereas a fifth, subsequent transmission (e.g., Tx=5) may be associated with a precoder (e.g., a precoding parameter) indexed by 5, and so forth. The precoder indices may be the unique indices of precoders or SRIs used in some number of past transmissions (e.g., SRIs 0 through 7 were used during the transmission intervals 320-a, 320-b, and 320-c). It is noted that the examples provided are for illustrative purposes, and it is understood that the precoder sequence or precoder pattern may be configured or formatted differently or in other ways.

Figure 4A:
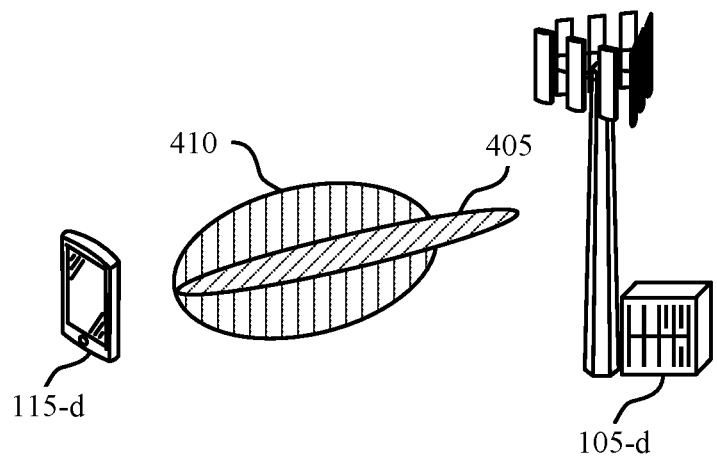
FIG. 4A illustrates an example of a wireless communications system that supports a network-indicated precoder sequence for uplink transmissions in accordance with aspects of the present disclosure.

FIG. 4A illustrates an example of a wireless communications system 400 that supports network-indicated precoder sequence for uplink transmissions in accordance with aspects of the present disclosure. In some examples, the wireless communications system 400 may implement aspects of the wireless communications systems 100, 200-a, and 200-b. For example, the wireless communications system 400 may include a base station 105-d and a UE 115-d, which may be examples of a base station 105 and a UE 115 as described with reference to FIGS. 1 through 3. The UE 115-d may communicate with the base station 105-d using one or more precoded communication beams. In some examples, the precoded communication beams may be considered wide beams or narrow beams. For example, the UE 115-d may communicate with the base station 105-d using one or more narrow beams 405, one or more wide beams 410, or a combination thereof. In some examples, a narrow beam 405 may be associated with narrower beam angles and greater beam gain in a particular direction compared to a wide beam 410.

The UE 115-d may store a first list of sets of precoding parameters associated with narrow beam precoding and a second list of sets of precoding parameters associated with wide beam precoding. For example, the sets of precoding parameters of the first list may be used to transmit uplink messages on one or more narrow beams 405, and sets of precoding parameters of the second list may be used to transmit uplink messages on one or more wide beams 410. In some examples, the UE 115-d may store a mapping between the first list and the second list.

The base station 105-d may configure a sequence of at least two sets of precoding parameters using the first list, the second list, or a combination thereof. For example, the base station 105-d may configure the sequence to include sets of precoding parameters from the first list, the second list, or a combination thereof.

Figure 4B:
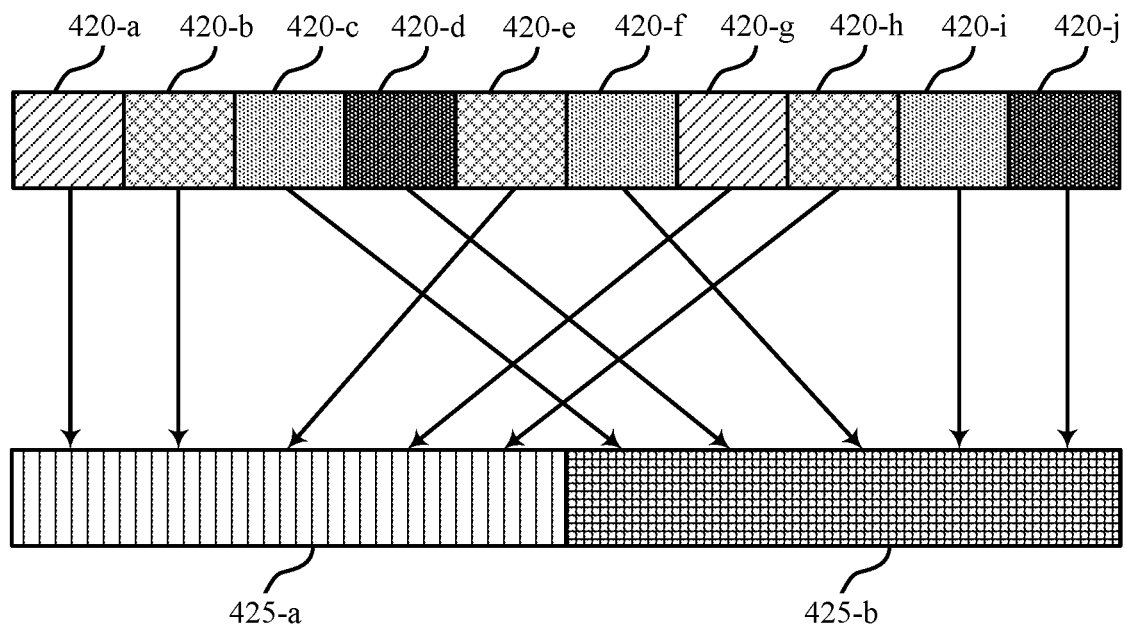
FIG. 4B illustrates an example of a precoder mapping that supports a network-indicated precoder sequence for uplink transmissions in accordance with aspects of the present disclosure.

FIG. 4B illustrates an example of a precoder mapping 415 that supports network-indicated precoder sequence for uplink transmissions in accordance with aspects of the present disclosure. In some examples, the precoder mapping 415 may implement aspects of the wireless communications system 400 as respectively described with reference to FIG. 4A. For example, the precoder mapping 415 may depict a mapping between a first list of sets precoding parameters associated with narrow beam precoding and a second list of sets of precoding parameters associated with wide beam precoding. The precoder mapping 415 may be used when a sequence of multiple precoding parameters are configured for a UE 115 (such as UE 115-d described with reference to FIG. 4A), where precoders associated with different lists may be configured by a base station 105 based on the precoder mapping 415. In such cases, some precoder(s) may be identified by some value, identifier, or index, and the UE may be able to identify one or more precoders associated with one another based on the precoder mapping 415. For instance, a set of four different narrow beam precoders may have respective indices, whereas a wide beam precoder may have another index that corresponds to multiple narrow beam precoders. Thus, when configuring the UE with a sequence of precoding parameters, the index of the precoder in a list may be indicated by the base station, and the UE may know which (previously used) precoding parameters to use for the sequence of precoders and corresponding transmissions, which may be based on the precoder mapping 415.

In one example, a precoder list (e.g., a narrow beam precoder list), P1, may be represented as: PrecoderList_P1= [Tx=1, precoder=[0, 1, 2, 3], Tx=2, precoder=[4,5], Tx=3, precoder=[6, 7, 8, 9]], where the Tx value may correspond to a respective transmission (e.g., a transmission of a first message at a first transmission time, a transmission of a second message at a second transmission time after the first transmission time, and so forth). In addition, the numerical values may indicate, for each transmission (e.g., Tx), the precoding parameters to use during the transmission. For example, precoding parameters associated with index values 0, 1, 2, and 3 in a list may be used for a first transmission, precoding parameters associated with index values 4 and 5 in a list may be used for a second transmission, and so forth. As another example, a precoder list (e.g., a wide beam precoder list), P2, may be represented as: WideBeamPrecoderList_P2=[narrowprecoder=[0, 1, 4, 6, 7], wideprecoder=[30], narrowprecoder=[2, 3, 5, 8, 9], wideprecoder= [31]]. Here, the values 30 and 31 may refer to an index corresponding to a set of wide beam precoding parameters. In addition, the narrow beam precoders or their index values (e.g., 0, 1, 4, 6, 7) may be associated with (e.g., mapped to) one or more wide beam precoders (e.g., 30). It is noted that the examples provided are for illustrative purposes, and it is understood that the described lists and the precoder mapping 415 may be configured or formatted differently or in other ways.

The first list may include any quantity of narrow beam precoding parameter sets 420 and the second list may include any quantity of wide beam precoding parameter sets 425. For example, the first list may include narrow beam precoding parameter sets 420-a, 420-b, 420-c, 420-d, 420-e, 420-f, 420-g, 420-h, 420-i, 420-j, and the second list may include wide beam precoding parameter sets 425-a, 425-b. In some examples, the narrow beam precoding parameter sets 420 may correspond to precoding parameter sets allocated during some number of previous transmissions. For example, the narrow beam precoding parameters sets 420-a, 420-b, 420-c, and 420-d may correspond to narrow beam precoding parameter sets used for a first prior transmission, the narrow beam precoding parameter sets 420-e and 420-f may correspond to narrow beam precoding parameter sets used for a second prior transmission, and narrow beam precoding parameter sets 420-g, 420-h, 420-i, and 420-j may correspond to narrow beam precoding parameter sets used for a third prior transmission.

The precoder mapping 415 may be based on a beam angle associated with each narrow beam precoding parameter set 420 (e.g., the beam angle used when transmitting an uplink message using a particular narrow beam precoding parameter set 420). For example, narrow beam precoding parameter sets 420-a and 420-g may be associated with a first beam angle, narrow beam precoding parameter sets 420-b, 420-e, and 420-h may be associated with a second beam angle, narrow beam precoding parameter sets 420-c, 420-f, and 420-i may be associated with a third beam angle, and narrow beam precoding parameter sets 420-d and 420-j may be associated with a fourth beam angle. In the example of FIG. 4B, the narrow beam precoding parameter sets 420 associated with the first beam angle and the second beam angle (e.g., narrow beam precoding parameter sets 420-a, 420-b, 420-e, 420-g, and 420-h) may be mapped to the wide beam precoding parameter set 425-a, and the narrow beam precoding parameter sets 420 associated with the third beam angle and the fourth beam angle (e.g., narrow beam precoding parameter sets 420-c, 420-d, 420-f, 420-i, and 420-j) may be mapped to the wide beam precoding parameter set 425-b.

In some examples, the first beam angle and the second beam angle may be positive beam angles, and the third beam angle and the fourth beam angle may be negative beam angles. In some other examples, the first beam angle and the second beam angle may have magnitudes larger than the third beam angle and the fourth beam angle (or vice versa). In some examples, the first, second, third, and fourth beam angles may be different angles (e.g., the first beam angle may be −45°, the second beam angle may be −22.5°, the third beam angle may be 22.5°, and the fourth beam angle may be 45°, to name a few possible angles). The wide beam precoder parameter sets 425-a and 425-b may cover relatively larger beam angles than a narrow beam precoder according to the precoder mapping 415 (e.g., wide beam precoder parameter set 425-a may cover all negative angles while wide beam precoder parameter set 425-b may cover all positive angles). It is noted that any mapping of beam angle to wide beam precoding parameter set 425 is possible.

Figure 5:
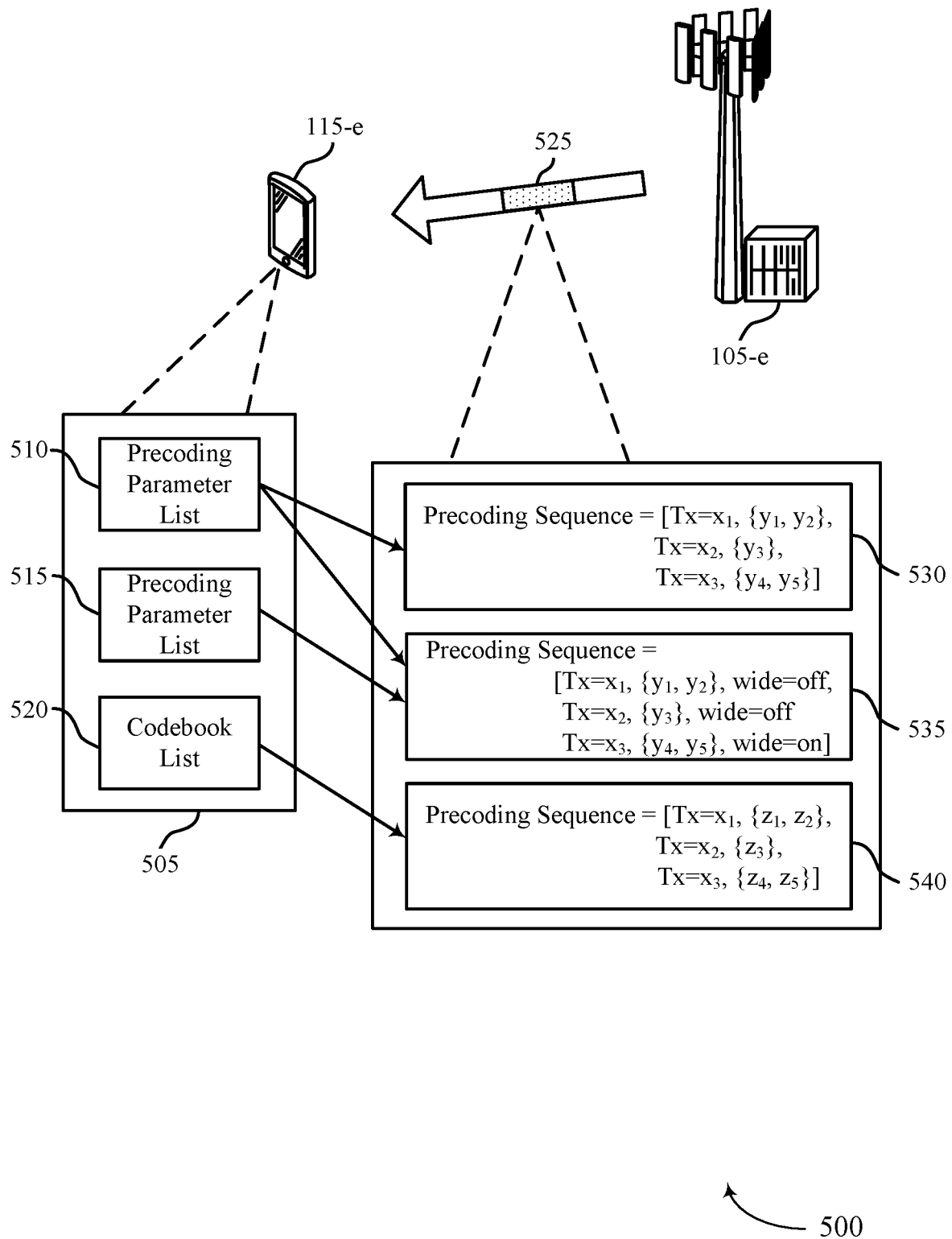
FIG. 5 illustrates an example of a wireless communications system that supports a network-indicated precoder sequence for uplink transmissions in accordance with aspects of the present disclosure.

FIG. 5 illustrates an example of a wireless communications system 500 that supports network-indicated precoder sequence for uplink transmissions in accordance with aspects of the present disclosure. In some examples, the wireless communications system 500 may implement aspects of the wireless communications systems 100, 200-a, and 200-b. For example, the wireless communications system 500 may include a base station 105-e and a UE 115-e, which may be examples of a base station 105 and a UE 115 as described with reference to FIGS. 1 through 4B.

The UE 115-e may store one or more lists of sets of precoding parameters, or one or more codebooks, or a combination thereof. For example, the UE 115-e may store a precoding parameter list 510 that includes sets of precoding parameters associated with narrow beam precoding, a precoding parameter list 515 that includes sets of precoding parameters associated with wide beam precoding, a codebook list 520 that includes one or more codebooks, or a combination thereof. Additionally, the UE 115-e may store a mapping between the precoding parameter list 510 and the precoding parameter list 515.

The base station 105-e may transmit a message 525 including a sequence of at least two sets of precoding parameters to the UE 115-e based on whether the UE 115-e and the base station 105-e are communicating according to a codebook-based precoding scheme or a non-codebook-based precoding scheme. For example, the message 525 may include a precoding sequence 530 or a precoding sequence 535 if the UE 115-e and the base station 105-e are communicating according to a non-codebook-based precoding scheme and may include a precoding sequence 540 if the UE 115-e and the base station 105-e are communicating according to a codebook-based precoding scheme.

The base station 105-e may transmit the precoding sequence 530 to configure a sequence of at least two sets of precoding parameters included in the precoding parameter list 510. For example, the precoding sequence 530 may indicate the sets of precoding parameters to use for a transmission $x_1$, $x_2$, and $x_3$, where $x_2$ is subsequent to $x_1$ in a time domain and $x_3$ is subsequent to $x_2$ in time. For the transmission $x_1$, the precoding sequence 530 may indicate sets of precoding parameters from the precoding parameter list 510 that correspond to $y_1$ and $y_2$, where $y_1$ and $y_2$ may be SRIs. The UE 115-$f$ may select the sets of precoding parameters corresponding to $y_1$ and $y_2$ and may transmit a first uplink message using the set of precoding parameters corresponding to $y_1$ and a second uplink message using the set of precoding parameters corresponding to $y_2$. The UE 115-$f$ may transmit the first uplink message on a first spatial layer (e.g., using a first beam) and the second uplink message on a second spatial layer (e.g., using a second beam) in a same slot of a time domain.

Similarly, for transmission $x_2$, the UE 115-$f$ may select a set of precoding parameters from the precoding parameter list 510 that corresponds to $y_3$ based on the precoding sequence 530, where $y_3$ may be an SRI. The UE 115-$f$ may transmit a third uplink message using the set of precoding parameters corresponding to $y_3$. For transmission $x_3$, the UE 115-$f$ may select sets of precoding parameters from the precoding parameter list 510 that correspond to $y_4$ and $y_5$, where $y_4$ and $y_5$ may be SRIs. The UE 115-$f$ may transmit a fourth uplink message using the set of precoding parameters corresponding to $y_4$ and a fifth uplink message using the set of precoding parameters corresponding to $y_5$. The UE 115-$f$ may transmit the fourth uplink message and the fifth uplink message in a same slot of a time domain using different spatial layers (e.g., using different beams).

The base station 105-$e$ may transmit the precoding sequence 535 to optionally signal the UE 115-$e$ to use a set of wide beam precoding parameters to transmit one or more uplink messages indicated by the precoding sequence 535. For example, channel condition estimates may decrease in accuracy with time, and wide beams may cover a wider coverage area at a smaller signal-to-noise-ratio (SNR) relative to narrow beams. Accordingly, in some cases, the base station 105-$e$ may configure the UE 115-$e$ to optionally use a set of wide beam precoding parameters to transmit one or more uplink messages.

To indicate to the UE 115-$e$ which set of precoding parameters to use, the precoding sequence 535 may include one or more flags (e.g., bit fields) that indicate whether to use a set of precoding parameters from the precoding parameter list 510 or to use a corresponding set of precoding parameters from the precoding parameter list 515. For example, in the example of FIG. 5, the precoding sequence 535 may indicate a same sequence as the precoding sequence 530 and may include a 'wide' flag for each transmission indicated by the sequence. Here, the 'wide' flag may be "off" for transmissions $x_1$ and $x_2$ and "on" for transmission $x_3$. Accordingly, the UE 115-$e$ may select sets of precoding parameters corresponding to $y_1$ and $y_2$ from the precoding parameter list 510, a set of precoding parameters corresponding to $y_3$ from the precoding parameter list 510, and sets of precoding parameters corresponding to $y_4$ and $y_5$ from the precoding parameter list 515 (e.g., using the mapping between precoding parameter list 510 and precoding parameter list 515). The UE 115-$e$ may then transmit the uplink messages according to the precoding sequence 535 using the selected sets of precoding parameters.

The base station 105-$e$ may transmit the precoding sequence 540 to configure a sequence of at least two sets of precoding parameters included in the codebook list 520. For example, the precoding sequence 540 may indicate a sequence of codebooks to use over a set of transmissions $x_1$, $x_2$, and $x_3$, where $x_2$ is subsequent to $x_1$ in a time domain and $x_3$ is subsequent to $x_2$ in time. Based on the precoding sequence 540, the UE 115-$f$ may select codebooks corresponding to $z_1$ and $z_2$ from the codebook list 520 to use for uplink messages associated with transmission $x_1$, where $z_1$ and $z_2$ may be PMIs, rank indicators, SRIs, or a combination thereof. Accordingly, the UE 115-$f$ may transmit a first uplink message a first uplink message using the codebook corresponding to $z_1$ and a second uplink message using the codebook corresponding to $z_2$. The UE 115-$f$ may transmit the first uplink message and the second uplink message in a same slot of a time domain using different spatial layers (e.g., using different beams).

Similarly, for transmission $x_2$, the UE 115-$f$ may select a codebook from the codebook list 520 that corresponds to $z_3$ based on the precoding sequence 540, where $z_3$ may be a PMI, a rank indicator, an SRI, or a combination thereof. The UE 115-$f$ may transmit a third uplink message using the codebook corresponding to $z_3$. For transmission $x_3$, the UE 115-$f$ may select codebooks from the codebook list 520 that correspond to $z_4$ and $z_5$, where $z_4$ and $z_5$ may be PMIs, rank indicators, SRIs, or a combination thereof. The UE 115-$f$ may transmit a fourth uplink message using the codebook corresponding to $z_4$ and a fifth uplink message using the codebook corresponding to $z_5$. The UE 115-$f$ may transmit the fourth uplink message and the fifth uplink message in a same slot of a time domain using different spatial layers (e.g., using different beams).

Figure 6:
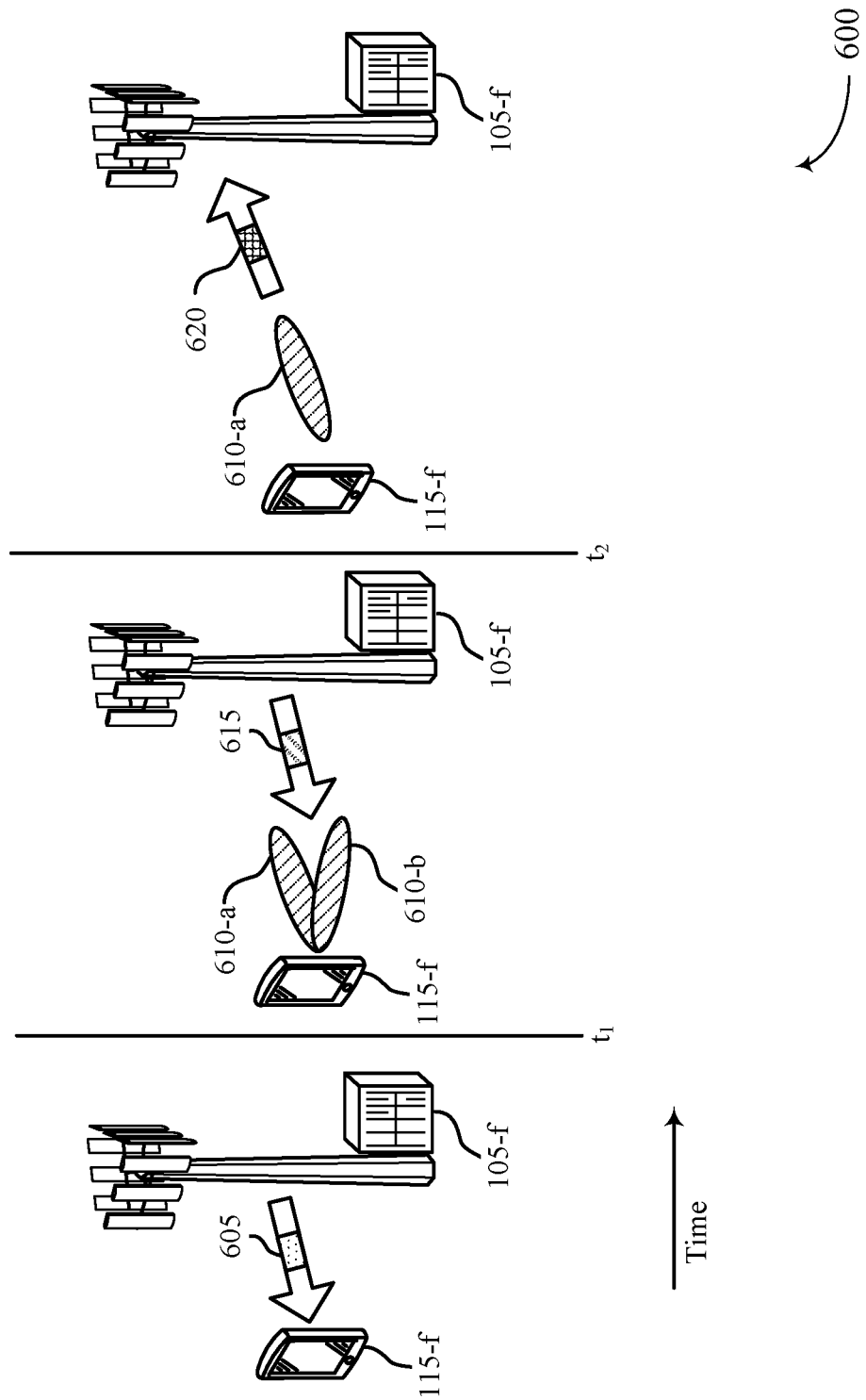
FIG. 6 illustrates an example of a communication sequence that supports a network-indicated precoder sequence for uplink transmissions in accordance with aspects of the present disclosure.

FIG. 6 illustrates an example of a communication sequence 600 that supports network-indicated precoder sequence for uplink transmissions in accordance with aspects of the present disclosure. In some examples, the communication sequence 600 may implement aspects of the wireless communications systems 100, 200-$a$, 200-$b$, 400, and 500 as respectively described with reference to FIGS. 1 through 2B, 4A, and 5. For example, the communication sequence 600 may depict a base station 105-$f$ and a UE 115-$f$, which may be examples of a base station 105 and a UE 115 as described with reference to FIGS. 1 through 5.

The communication sequence 600 may illustrate the tuning of sets of precoding parameters indicated by a sequence of at least two sets of precoding parameters. For example, prior to time $t_1$, the base station 105-$f$ may transmit a sequence indicator 605 to the UE 115-$f$ that configures a sequence of at least two sets of precoding parameters to use over a corresponding quantity of uplink messages. Prior to transmitting an uplink message according to the sequence, the UE 115-$f$ may be configured to transmit SRSs using the precoding parameters associated with the uplink message. For example, between time $t_1$ and time $t_2$, the UE 115-$f$ may transmit a first SRS using a precoded UE communication beam 610-$a$ and a second SRS using a precoded UE communication beam 610-$b$ according to the precoding parameters indicated by the sequence. The base station 105-$f$ may measure channel conditions using the first SRS and the second SRS and may transmit a message 615 that further configures the sets of precoding parameters of the sequence. For example, the message 615 may configure the UE 115-$f$ to use the precoded UE communication beam 610-$a$ to transmit an uplink message and to not use the precoded UE communication beam 610-$b$. In such cases, the transmission of the SRS(s) by the UE 115-$f$ may enable further modification, optimization, or enhancement of a precoding pattern or sequence (e.g., a sequence of precoding parameters) for uplink transmissions by the UE 115-$f$. Accordingly, after time $t_2$, the UE 115-$f$ may transmit an uplink message 620 using the precoded UE communication beam 610-$a$ and the set of precoding parameters associated with the uplink message 620 as indicated by the sequence. In some examples, the UE 115-f may be configured to tune the precoding parameters associated with an uplink message for each uplink message associated with the sequence.

In some examples, the message 615 may cancel the sequence and to restart a precoding parameter selection procedure. For example, the message 615 may signal the UE 115-f to stop transmitting uplink messages according to the sequence and may restart a codebook-based or non-codebook-based precoding selection procedure. For example, the message 615 may request the UE 115-f to transmit one or more non-precoded SRSs, or the message 615 may include a CSI-RS and the UE 115-f may transmit one or more precoded SRSs in response to CSI-RS. In some examples, the message 615 may configure resources for the UE 115-f to transmit the one or more SRSs and/or receive the CSI-RS.

Figure 7:
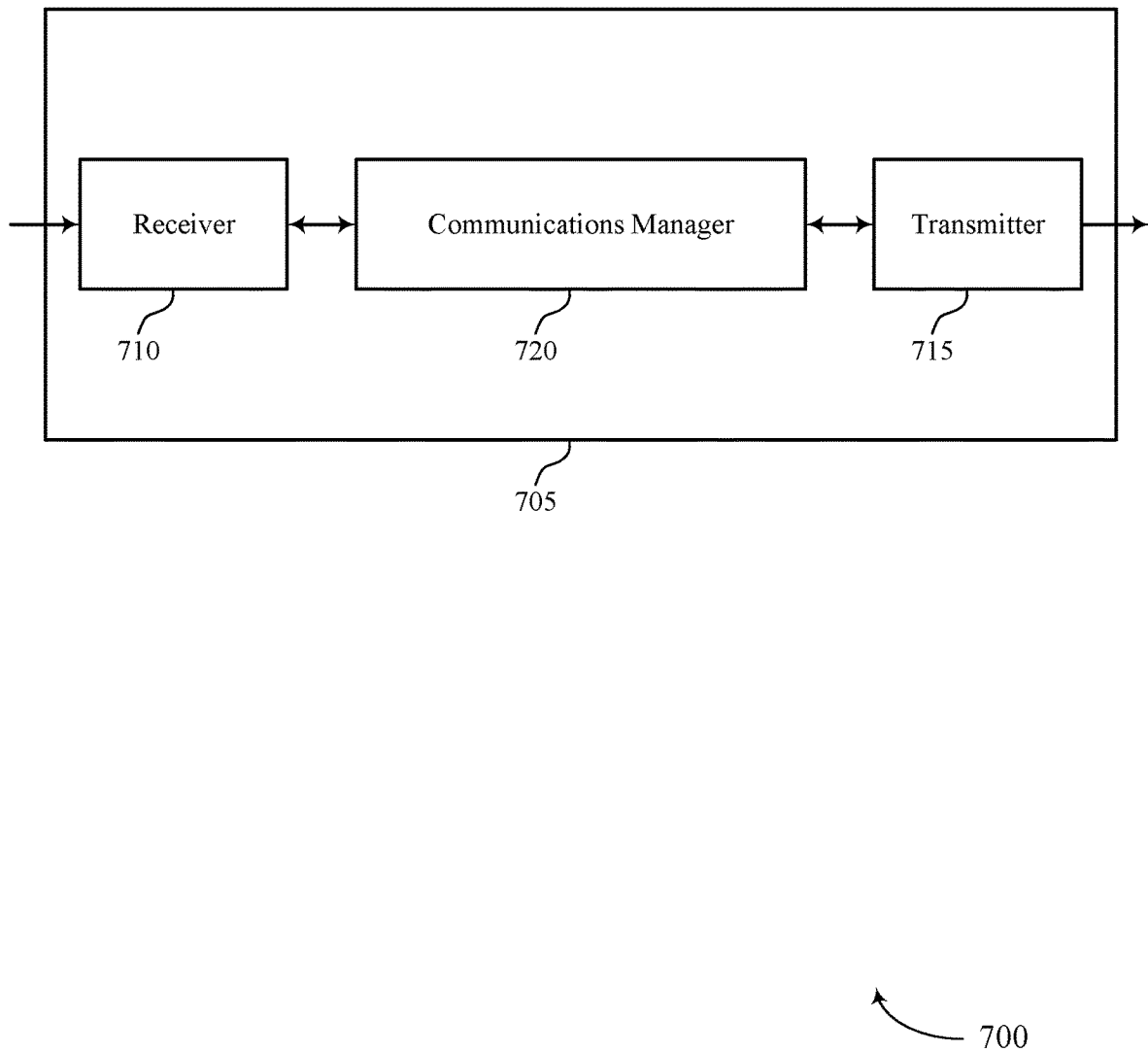
FIGS. 7 and 8 show block diagrams of devices that support a network-indicated precoder sequence for uplink transmissions in accordance with aspects of the present disclosure.

FIG. 7 shows a block diagram 700 of a device 705 that supports network-indicated precoder sequence for uplink transmissions in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to network-indicated precoder sequence for uplink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to network-indicated precoder sequence for uplink transmissions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of network-indicated precoder sequence for uplink transmissions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communications manager 720 may be configured as or otherwise support a means for transmitting, based on the sequence of the at least two sets of precoding parameters, the first uplink message using the first set of precoding parameters and the second uplink message using the second set of precoding parameters.

By including or configuring the communications manager 720 in accordance with examples as described herein, the device 705 (e.g., a processor controlling or otherwise coupled to the receiver 710, the transmitter 715, the communications manager 720, or a combination thereof) may reduce processing resources and power consumption associated with precoding uplink transmissions. For example, by transmitting uplink messages according to a sequence of at least two sets of precoding parameters, the device 705 may reduce signaling overhead associated with indicating precoding parameters.

Figure 8:
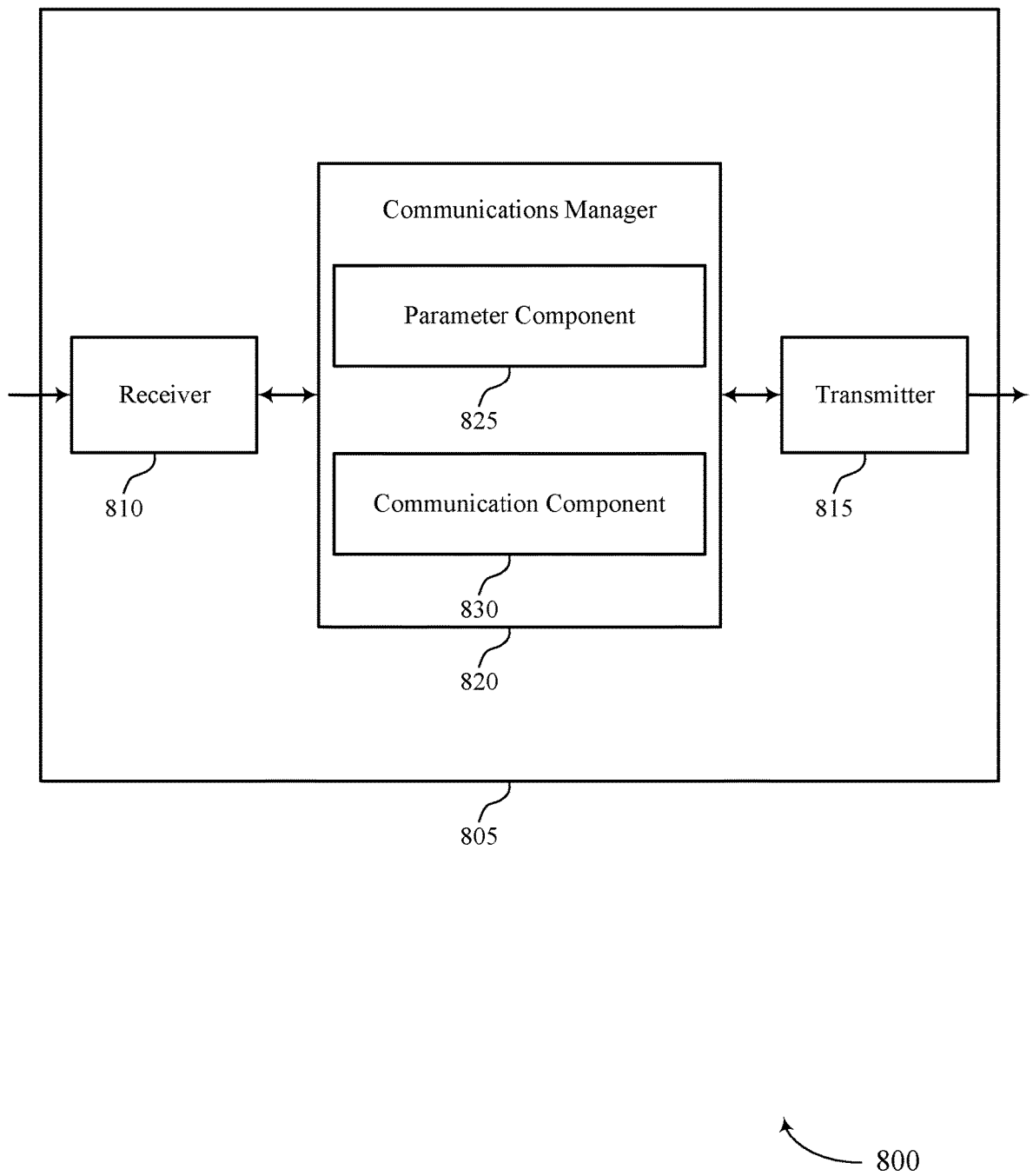

FIG. 8 shows a block diagram 800 of a device 805 that supports network-indicated precoder sequence for uplink transmissions in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to network-indicated precoder sequence for uplink transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to network-indicated precoder sequence for uplink transmissions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of network-indicated precoder sequence for uplink transmissions as described herein. For example, the communications manager 820 may include a parameter component 825 a communication component 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The parameter component 825 may be configured as or otherwise support a means for receiving a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communication component 830 may be configured as or otherwise support a means for transmitting, based on the sequence of the at least two sets of precoding parameters, the first uplink message using the first set of precoding parameters and the second uplink message using the second set of precoding parameters.

Figure 9:
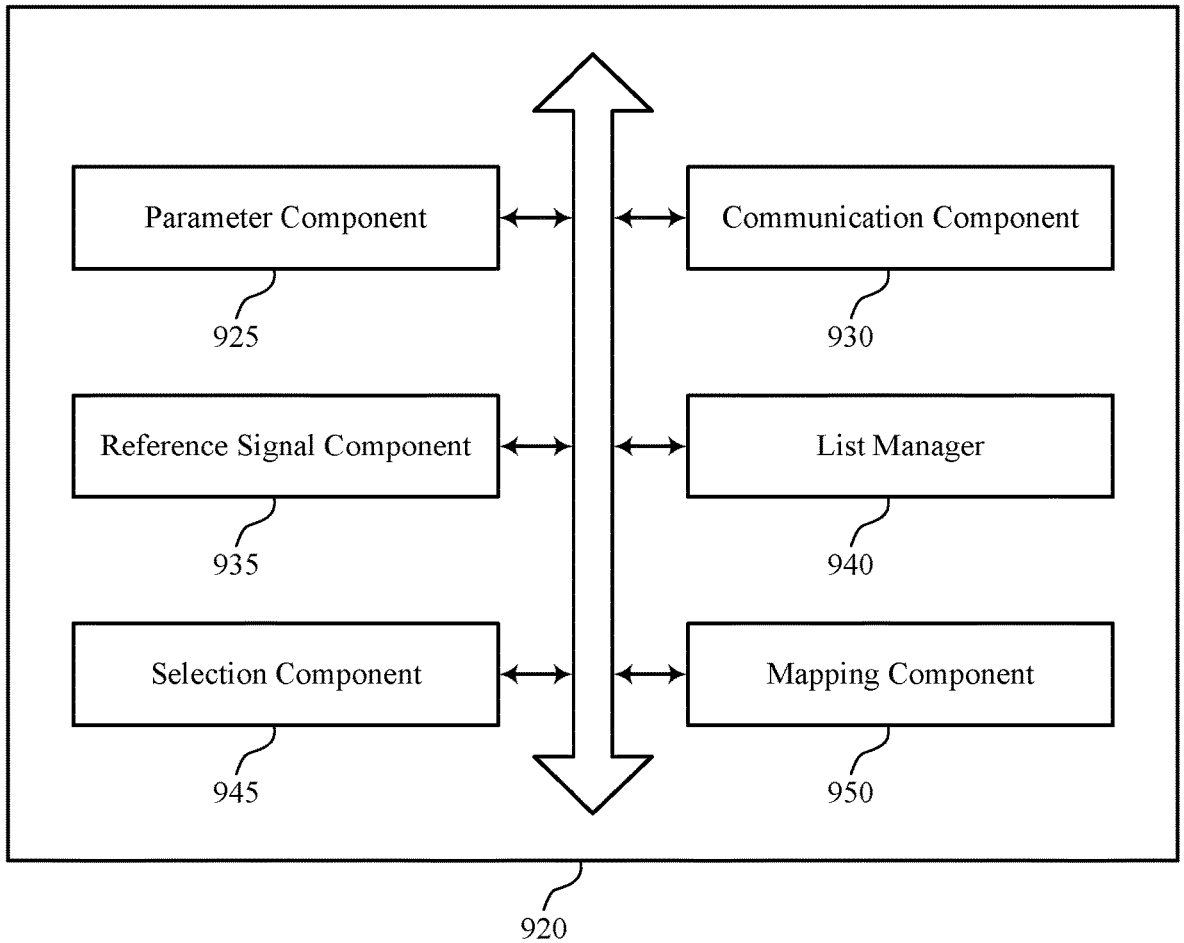
FIG. 9 shows a block diagram of a communications manager that supports a network-indicated precoder sequence for uplink transmissions in accordance with aspects of the present disclosure.

FIG. 9 shows a block diagram 900 of a communications manager 920 that supports network-indicated precoder sequence for uplink transmissions in accordance with aspects of the present disclosure. The communications manager 920 may be an example of aspects of a communications manager 720, a communications manager 820, or both, as described herein. The communications manager 920, or various components thereof, may be an example of means for performing various aspects of network-indicated precoder sequence for uplink transmissions as described herein. For example, the communications manager 920 may include a parameter component 925, a communication component 930, a reference signal component 935, a list manager 940, a selection component 945, a mapping component 950, or any combination thereof. Each of these components may communicate, directly or indirectly, with one another (e.g., via one or more buses).

The communications manager 920 may support wireless communication at a UE in accordance with examples as disclosed herein. The parameter component 925 may be configured as or otherwise support a means for receiving a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communication component 930 may be configured as or otherwise support a means for transmitting, based on the sequence of the at least two sets of precoding parameters, the first uplink message using the first set of precoding parameters and the second uplink message using the second set of precoding parameters.

In some examples, the reference signal component 935 may be configured as or otherwise support a means for transmitting, prior to transmitting the first uplink message and the second uplink message, one or more SRSs in one or more uplink transmissions, where the sequence of the at least two sets of precoding parameters is based on the one or more SRSs, where the one or more SRSs includes precoded SRSs or non-precoded SRSs.

In some examples, the list manager 940 may be configured as or otherwise support a means for storing a list including a set of multiple sets of precoding parameters, the list including the at least two sets of precoding parameters.

In some examples, the message indicates which sets of precoding parameters from the set of multiple sets of precoding parameters from the list are included in the sequence.

In some examples, the list includes a list of a previous number of sets (e.g., a list of the past N sets) of precoding parameters used by the UE. In some examples, the previous number of sets (e.g., N) is a network-configured positive integer.

In some examples, the list manager 940 may be configured as or otherwise support a means for storing a first list including sets of precoding parameters associated with narrow beam precoding. In some examples, the list manager 940 may be configured as or otherwise support a means for storing a second list including sets of precoding parameters associated with wide beam precoding.

In some examples, the selection component 945 may be configured as or otherwise support a means for selecting, for the first uplink message, the first set of precoding parameters from the first list or the second list based on receiving the message indicating the sequence of the at least two sets of precoding parameters. In some examples, the selection component 945 may be configured as or otherwise support a means for selecting, for the second uplink message, the second set of precoding parameters from the first list or the second list based at list in part on receiving the message indicating the sequence of the at least two sets of precoding parameters.

In some examples, the message may include at least two flags associated with the at least two sets of precoding parameters, where the flags indicate whether a respective set of precoding parameters is associated with the first list or the second list. In some examples, the selection component 945 may be configured as or otherwise support a means for selecting the first set of precoding parameters from the first list based on a first flag indicating that the first set of precoding parameters is associated with the first list. In some examples, the selection component 945 may be configured as or otherwise support a means for selecting the second set of precoding parameters from the second list based on a second flag indicating that the second set of precoding parameters is associated with the second list.

In some examples, the mapping component 950 may be configured as or otherwise support a means for storing a mapping between the first list and the second list, where selecting the second set of precoding parameters from the second list is based on the mapping.

In some examples, the first set of precoding parameters and the second set of precoding parameters include an SRI, a rank of an uplink transmission, a PMI, or a combination thereof.

In some examples, the communication component 930 may be configured as or otherwise support a means for transmitting a set of uplink messages according to the sequence of the at least two sets of precoding parameters, the set of uplink messages including the first uplink message and the second uplink message.

In some examples, the reference signal component 935 may be configured as or otherwise support a means for transmitting one or more SRSs based on receiving the message that indicates the sequence of the at least two sets of precoding parameters. In some examples, the parameter component 925 may be configured as or otherwise support a means for receiving a second message that indicates one or more precoding parameters of the first set of precoding parameters, where transmitting the first uplink message includes transmitting the first uplink message using the one or more precoding parameters of the first set of precoding parameters indicated in the second message.

In some examples, the reference signal component 935 may be configured as or otherwise support a means for transmitting one or more SRSs based on receiving the message that indicates the sequence of the at least two sets of precoding parameters. In some examples, the parameter component 925 may be configured as or otherwise support a means for receiving, based on transmitting the one or more SRSs, a second message that indicates to the UE to restart a precoding parameter selection procedure, where the second message configures a channel measurement resource for the precoding parameter selection procedure or requests transmission of a non-precoded SRS.

In some examples, the sequence of the at least two sets of precoding parameters corresponds to a set of scheduled uplink messages, a set of configured uplink messages, or a combination thereof.

In some examples, the message includes a DCI message that schedules or releases a dynamic uplink grant or a configured uplink grant, a DCI message responsive to one or more SRSs transmitted by the UE, a RRC message, a MAC-CE message, or a combination thereof.

Figure 10:
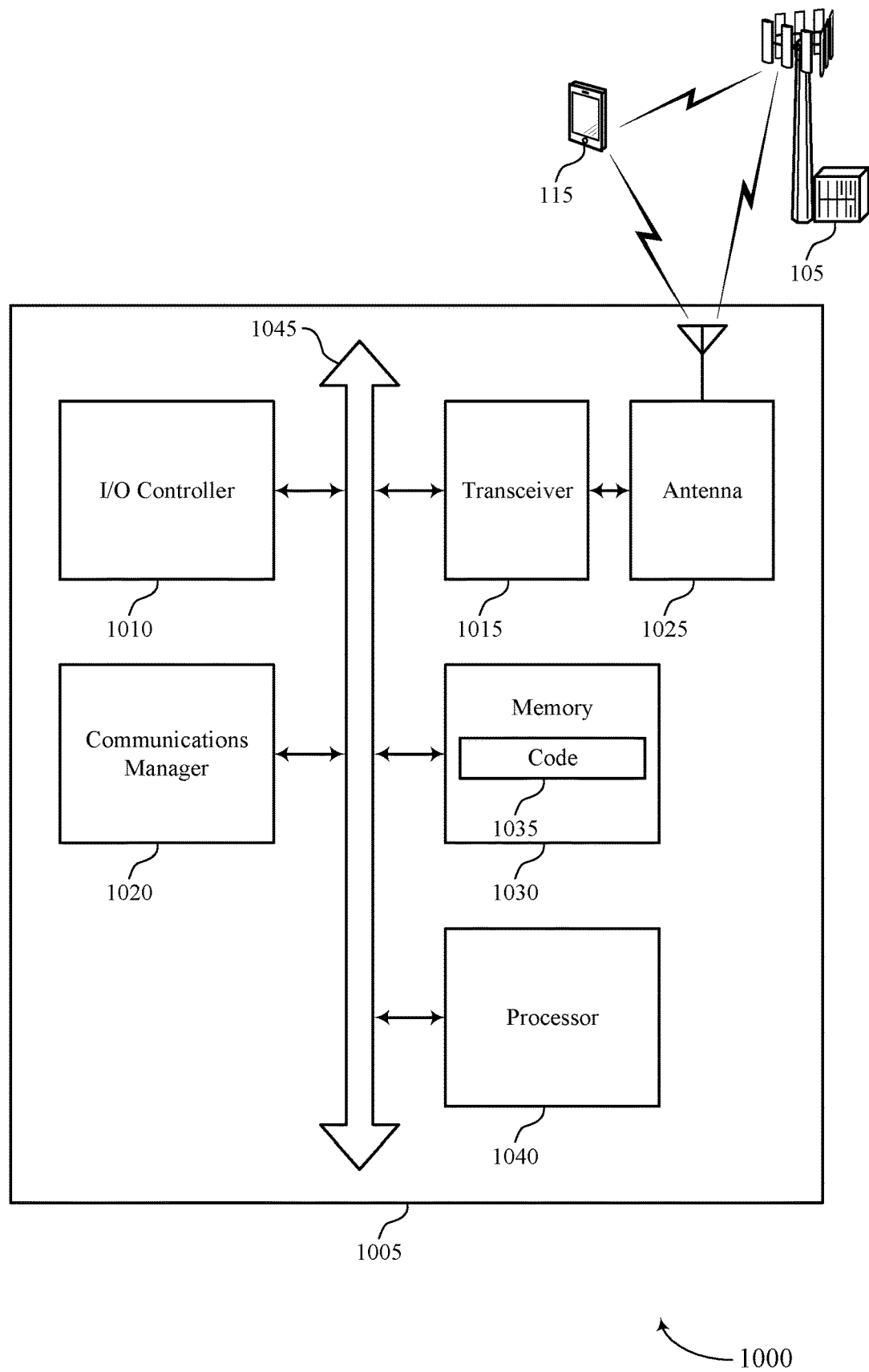
FIG. 10 shows a diagram of a system including a device that supports a network-indicated precoder sequence for uplink transmissions in accordance with aspects of the present disclosure.

FIG. 10 shows a diagram of a system 1000 including a device 1005 that supports network-indicated precoder sequence for uplink transmissions in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting network-indicated precoder sequence for uplink transmissions). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communications manager 1020 may be configured as or otherwise support a means for transmitting, based on the sequence of the at least two sets of precoding parameters, the first uplink message using the first set of precoding parameters and the second uplink message using the second set of precoding parameters.

By including or configuring the communications manager 1020 in accordance with examples as described herein, the device 1005 may reduce signaling overhead and latency and increase throughput associated with precoding uplink transmissions. For example, receiving message indicating a sequence of at least two sets of precoding parameters may reduce signaling associated with indicating precoding parameters. Additionally, transmitting uplink messages according to the sequence may promote improvements to efficiency and resource usage of precoding uplink transmissions and, in some examples, may promote spectral efficiency, reduce latency, reduce power consumption, improve coordination between the UE and a core network, and increase battery life, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of network-indicated precoder sequence for uplink transmissions as described herein, or the processor 1040 and the memory 1030 may be otherwise configured to perform or support such operations.

Figure 11:
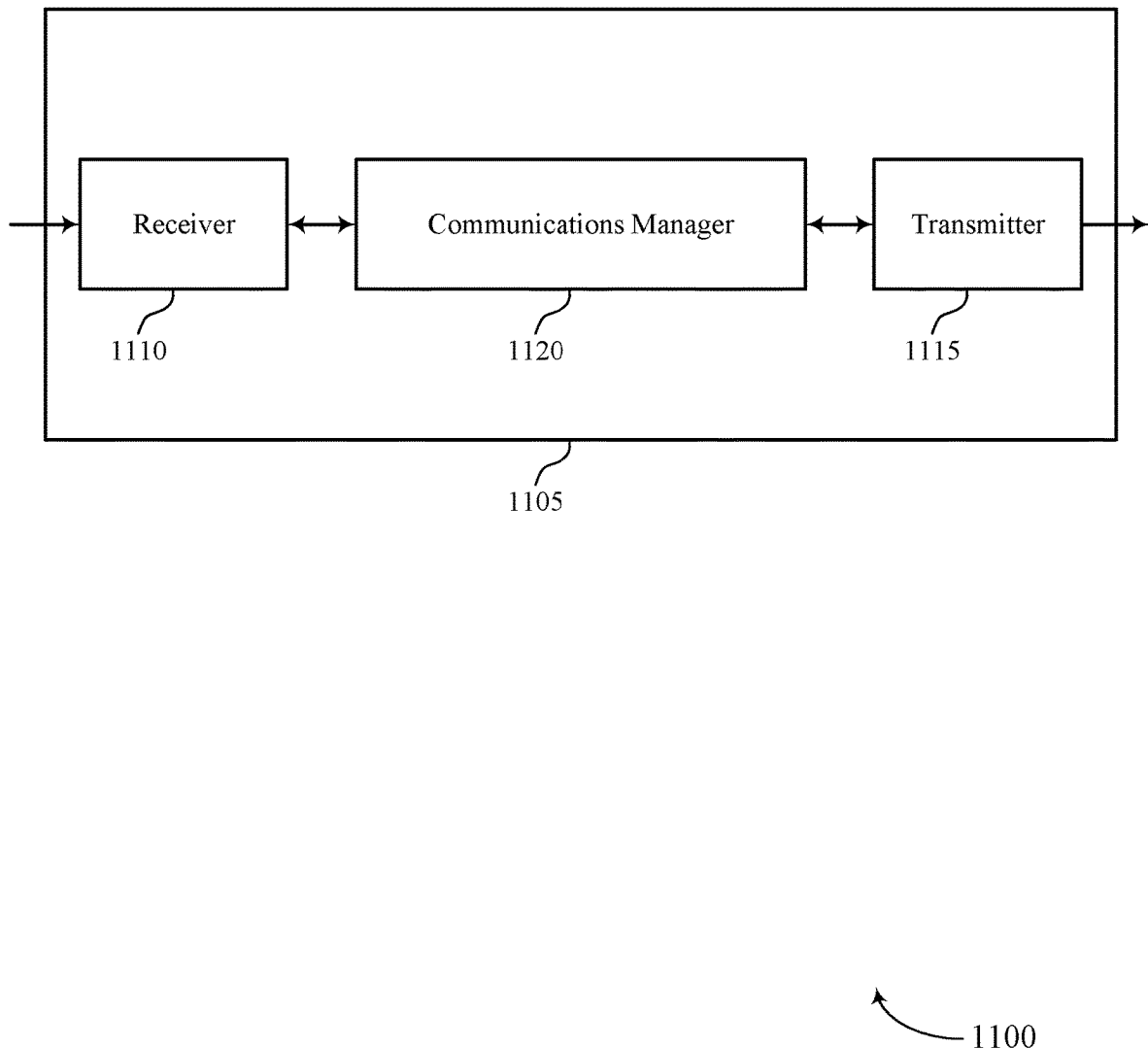
FIGS. 11 and 12 show block diagrams of devices that support a network-indicated precoder sequence for uplink transmissions in accordance with aspects of the present disclosure.

FIG. 11 shows a block diagram 1100 of a device 1105 that supports network-indicated precoder sequence for uplink transmissions in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to network-indicated precoder sequence for uplink transmissions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to network-indicated precoder sequence for uplink transmissions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of network-indicated precoder sequence for uplink transmissions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communications manager 1120 may be configured as or otherwise support a means for receiving, based on the sequence of the at least two sets of precoding parameters, the first uplink message according to the first set of precoding parameters and the second uplink message according to the second set of precoding parameters.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may reduce processing resources and power consumption associated with precoding uplink transmissions. For example, by transmitting a sequence of at least two sets of precoding parameters, the device 1105 may reduce signaling overhead associated with indicating precoding parameters.

Figure 12:
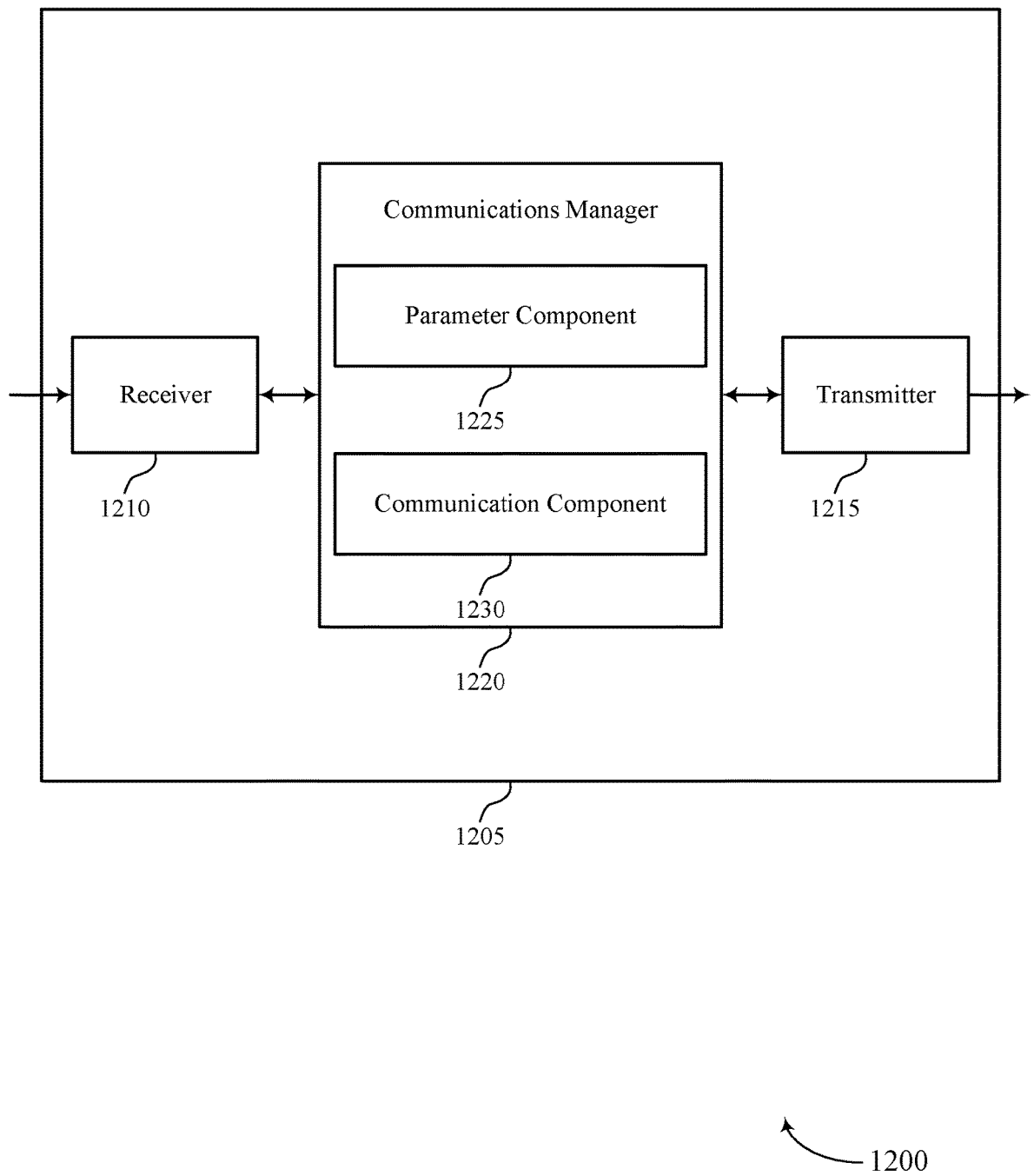

FIG. 12 shows a block diagram 1200 of a device 1205 that supports network-indicated precoder sequence for uplink transmissions in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to network-indicated precoder sequence for uplink transmissions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to network-indicated precoder sequence for uplink transmissions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of network-indicated precoder sequence for uplink transmissions as described herein. For example, the communications manager 1220 may include a parameter component 1225 a communication component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The parameter component 1225 may be configured as or otherwise support a means for transmitting a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communication component 1230 may be configured as or otherwise support a means for receiving, based on the sequence of the at least two sets of precoding parameters, the first uplink message according to the first set of precoding parameters and the second uplink message according to the second set of precoding parameters.

Figure 13:
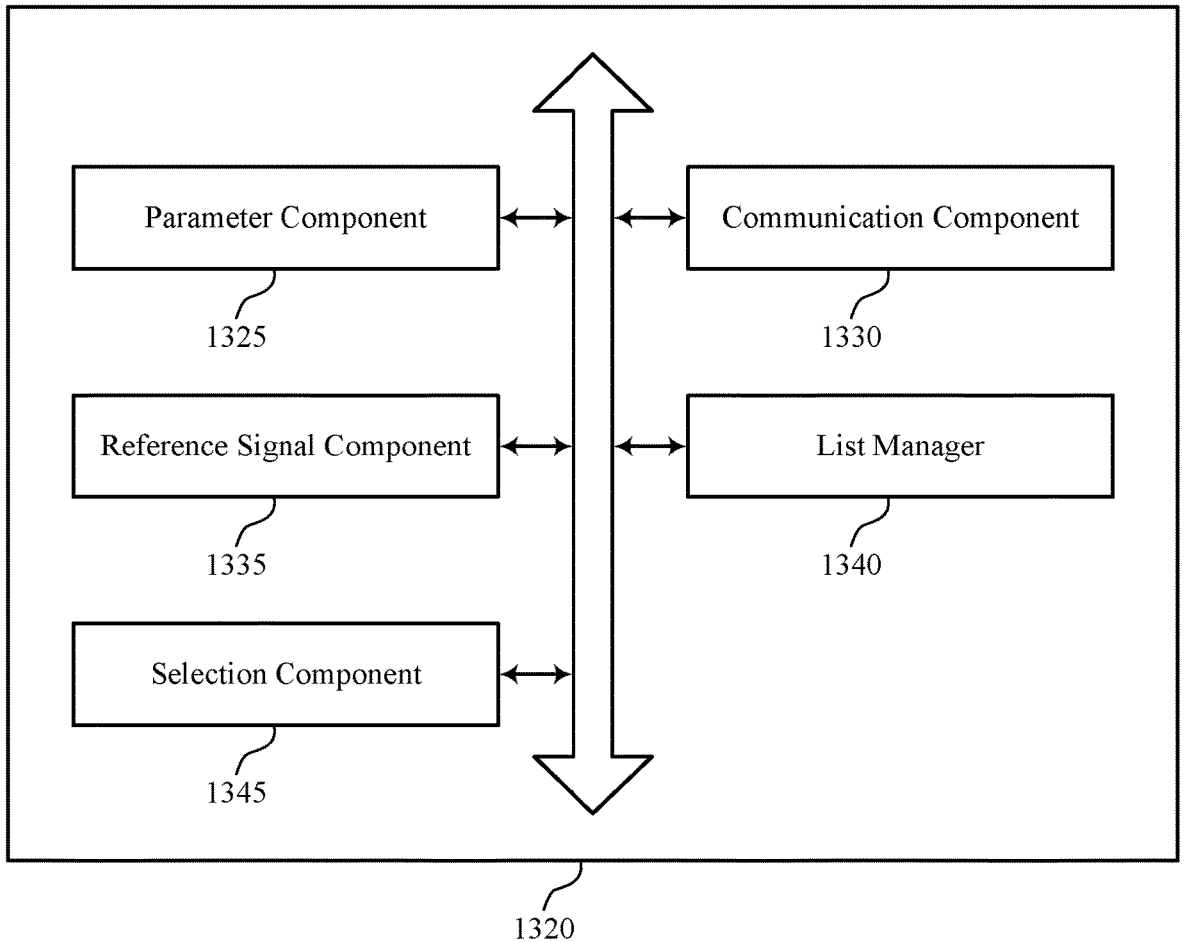
FIG. 13 shows a block diagram of a communications manager that supports a network-indicated precoder sequence for uplink transmissions in accordance with aspects of the present disclosure.

FIG. 13 shows a block diagram 1300 of a communications manager 1320 that supports network-indicated precoder sequence for uplink transmissions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of network-indicated precoder sequence for uplink transmissions as described herein. For example, the communications manager 1320 may include a parameter component 1325, a communication component 1330, a reference signal component 1335, a list manager 1340, a selection component 1345, or any combination thereof. Each of these components may communicate, directly or indirectly, with one another (e.g., via one or more buses).

The communications manager 1320 may support wireless communication at a base station in accordance with examples as disclosed herein. The parameter component 1325 may be configured as or otherwise support a means for transmitting a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communication component 1330 may be configured as or otherwise support a means for receiving, based on the sequence of the at least two sets of precoding parameters, the first uplink message according to the first set of precoding parameters and the second uplink message according to the second set of precoding parameters.

In some examples, the reference signal component 1335 may be configured as or otherwise support a means for receiving, prior to receiving the first uplink message and the second uplink message, one or more SRSs in one or more uplink transmissions, where the one or more SRSs include precoded SRSs or non-precoded SRSs. In some examples, the parameter component 1325 may be configured as or otherwise support a means for configuring the sequence of the at least two sets of precoding parameters based on receiving the one or more SRSs.

In some examples, the list manager 1340 may be configured as or otherwise support a means for identifying a list including a set of multiple sets of precoding parameters, the list including the at least two sets of precoding parameters.

In some examples, the parameter component 1325 may be configured as or otherwise support a means for configuring the sequence of the at least two sets of precoding parameters based on selecting the at least two sets of precoding parameters from the list.

In some examples, the list manager 1340 may be configured as or otherwise support a means for identifying a first list including sets of precoding parameters associated with narrow beam precoding parameters. In some examples, the list manager 1340 may be configured as or otherwise support a means for identifying a second list including sets of precoding parameters associated with wide beam precoding parameters.

In some examples, the message includes a first flag indicating that the first set of precoding parameters is associated with the first list. In some examples, the message includes a second flag indicating that the second set of precoding parameters is associated with the second list.

In some examples, the communication component 1330 may be configured as or otherwise support a means for refraining from transmitting a second message that configures the second set of precoding parameters based on transmitting the message that indicates the sequence of the at least two sets of precoding parameters.

In some examples, the first set of precoding parameters and the second set of precoding parameters include an SRI, a rank of an uplink transmission, a PMI, or a combination thereof.

In some examples, the communication component 1330 may be configured as or otherwise support a means for receiving a set of uplink messages according to the sequence of the at least two sets of precoding parameters, the set of uplink messages including the first uplink message and the second uplink message.

In some examples, the reference signal component 1335 may be configured as or otherwise support a means for receiving one or more SRSs based on receiving the message that indicates the sequence of the at least two sets of precoding parameters. In some examples, the selection component 1345 may be configured as or otherwise support a means for selecting one or more precoding parameters of the first set of precoding parameters based on receiving the one or more SRSs. In some examples, the parameter component 1325 may be configured as or otherwise support a means for transmitting a second message that configures the one or more precoding parameters of the first set of precoding parameters, where receiving the first uplink message includes receiving the first uplink message according to the one or more precoding parameters of the first set of precoding parameters.

In some examples, the reference signal component 1335 may be configured as or otherwise support a means for receiving one or more SRSs based on receiving the message that indicates the sequence of the at least two sets of precoding parameters. In some examples, the parameter component 1325 may be configured as or otherwise support a means for transmitting, based on receiving the one or more SRSs, a second message that indicates a restart to a precoding parameter selection procedure, where the second message configures a channel measurement resource for the precoding parameter selection procedure or requests transmission of a non-precoded SRS.

In some examples, the sequence of the at least two sets of precoding parameters corresponds to a set of scheduled uplink messages, a set of configured uplink messages, or a combination thereof.

In some examples, the message includes a DCI message that schedules or releases a dynamic uplink grant or a configured uplink grant, a DCI message responsive to one or more SRSs transmitted by the UE, a RRC message, a MAC-CE message, or a combination thereof.

Figure 14:
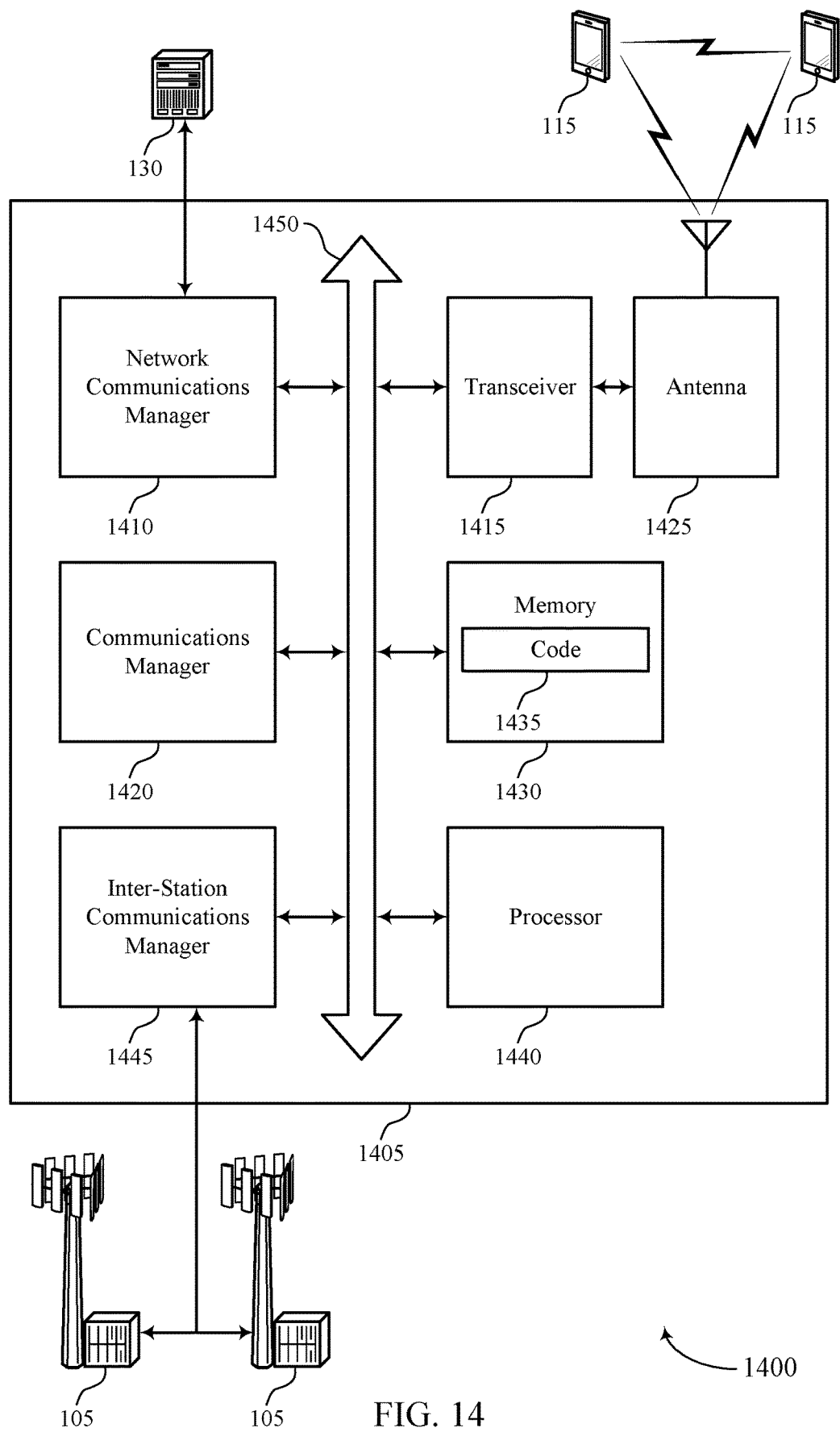
FIG. 14 shows a diagram of a system including a device that supports a network-indicated precoder sequence for uplink transmissions in accordance with aspects of the present disclosure.

FIG. 14 shows a diagram of a system 1400 including a device 1405 that supports network-indicated precoder sequence for uplink transmissions in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting network-indicated precoder sequence for uplink transmissions). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The communications manager 1420 may be configured as or otherwise support a means for receiving, based on the sequence of the at least two sets of precoding parameters, the first uplink message according to the first set of precoding parameters and the second uplink message according to the second set of precoding parameters.

By including or configuring the communications manager 1420 in accordance with examples as described herein, the device 1405 may reduce signaling overhead and latency and increase throughput associated with precoding uplink transmissions. For example, receiving message indicating a sequence of at least two sets of precoding parameters may reduce signaling associated with indicating precoding parameters. Additionally, transmitting uplink messages according to the sequence may promote improvements to efficiency and resource usage of precoding uplink transmissions and, in some examples, may promote spectral efficiency, reduce latency, reduce power consumption, improve coordination between the UE and the device 1405, and increase battery life, among other benefits.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of network-indicated precoder sequence for uplink transmissions as described herein, or the processor 1440 and the memory 1430 may be otherwise configured to perform or support such operations.

Figure 15:
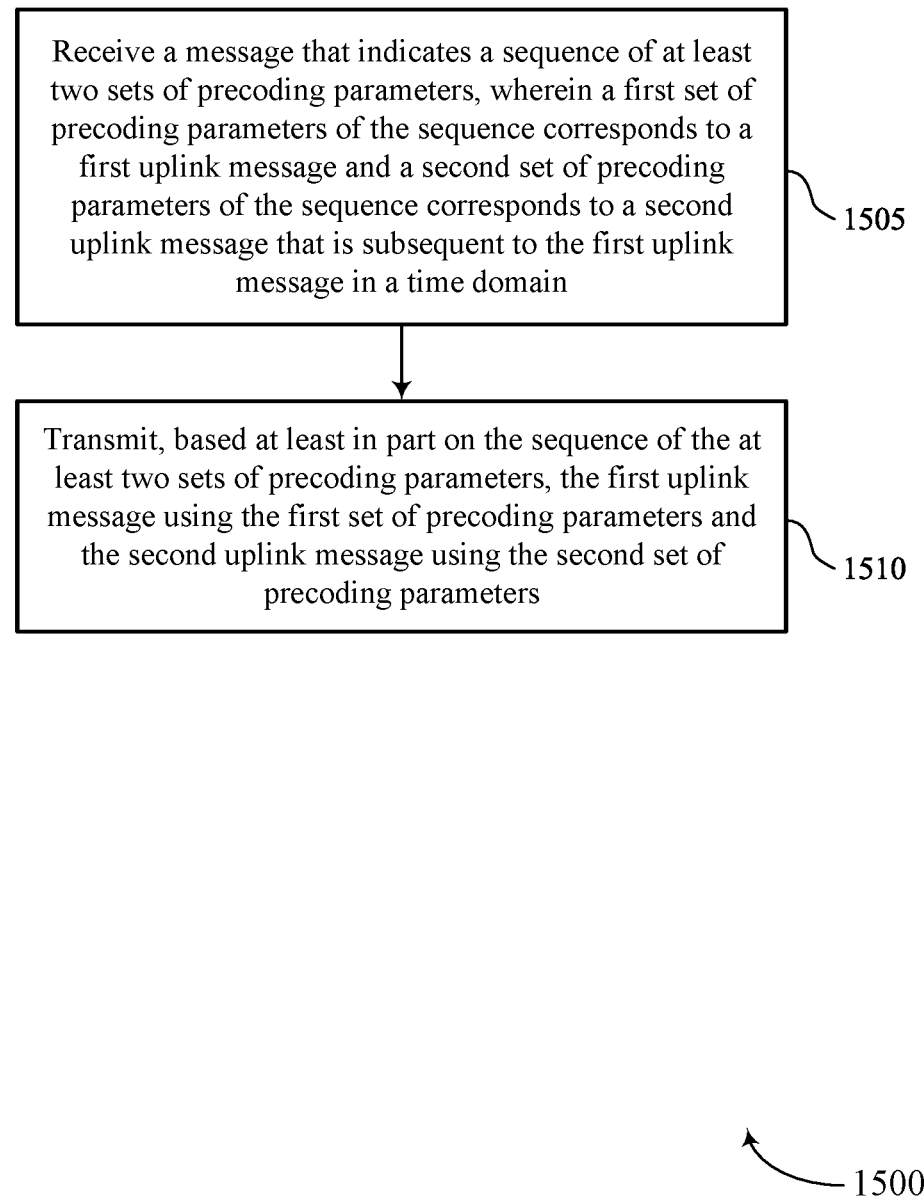
FIGS. 15 through 18 show flowcharts illustrating methods that support a network-indicated precoder sequence for uplink transmissions in accordance with aspects of the present disclosure.

FIG. 15 shows a flowchart illustrating a method 1500 that supports network-indicated precoder sequence for uplink transmissions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a message that indicates a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The operations of 1505 may be performed in accordance with examples as disclosed herein. In some examples, aspects of the operations of 1505 may be performed by a parameter component 925 as described with reference to FIG. 9.

At 1510, the method may include transmitting, based on the sequence of the at least two sets of precoding parameters, the first uplink message using the first set of precoding parameters and the second uplink message using the second set of precoding parameters. The operations of 1510 may be performed in accordance with examples as disclosed herein. In some examples, aspects of the operations of 1510 may be performed by a communication component 930 as described with reference to FIG. 9.

Figure 16:
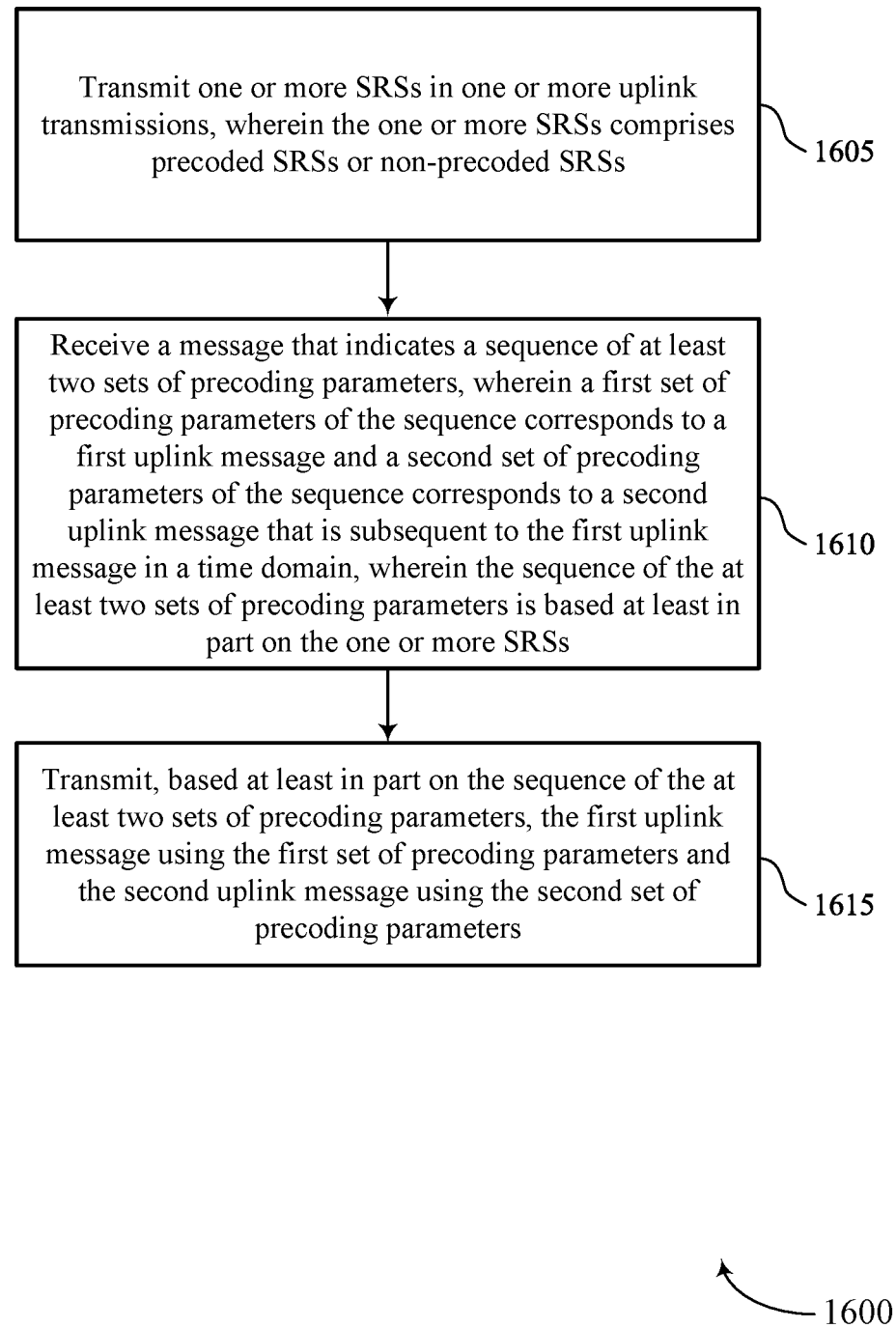

FIG. 16 shows a flowchart illustrating a method 1600 that supports network-indicated precoder sequence for uplink transmissions in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting one or more SRSs in one or more uplink transmissions, wherein the one or more SRSs comprises precoded SRSs or non-precoded SRSs. The operations of 1605 may be performed in accordance with examples as disclosed herein. In some examples, aspects of the operations of 1605 may be performed by a reference signal component 935 as described with reference to FIG. 9.

At 1610, the method may include receiving a message that indicates a sequence of at least two sets of precoding parameters, wherein a first set of precoding parameters of the sequence corresponds to a first uplink message and a second set of precoding parameters of the sequence corresponds to a second uplink message that is subsequent to the first uplink message in a time domain, wherein the sequence of the at least two sets of precoding parameters is based at least in part on the one or more SRSs. The operations of 1610 may be performed in accordance with examples as disclosed herein. In some examples, aspects of the operations of 1610 may be performed by a parameter component 925 as described with reference to FIG. 9.

At 1615, the method may include transmitting, based on the sequence of the at least two sets of precoding parameters, the first uplink message using the first set of precoding parameters and the second uplink message using the second set of precoding parameters. The operations of 1615 may be performed in accordance with examples as disclosed herein. In some examples, aspects of the operations of 1615 may be performed by a communication component 930 as described with reference to FIG. 9.

Figure 17:
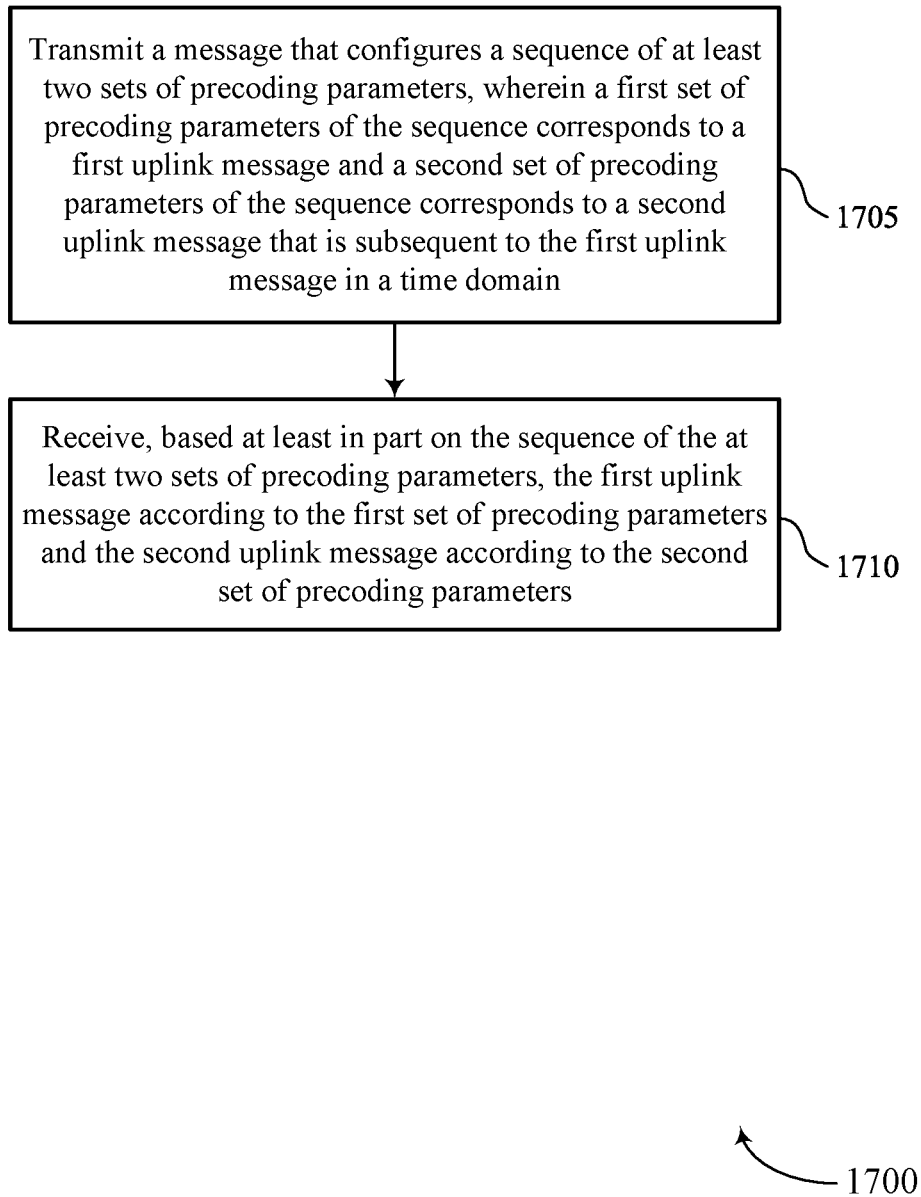

FIG. 17 shows a flowchart illustrating a method 1700 that supports network-indicated precoder sequence for uplink transmissions in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting a message that configures a sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The operations of 1705 may be performed in accordance with examples as disclosed herein. In some examples, aspects of the operations of 1705 may be performed by a parameter component 1325 as described with reference to FIG. 13.

At 1710, the method may include receiving, based on the sequence of the at least two sets of precoding parameters, the first uplink message according to the first set of precoding parameters and the second uplink message according to the second set of precoding parameters. The operations of 1710 may be performed in accordance with examples as disclosed herein. In some examples, aspects of the operations of 1710 may be performed by a communication component 1330 as described with reference to FIG. 13.

Figure 18:
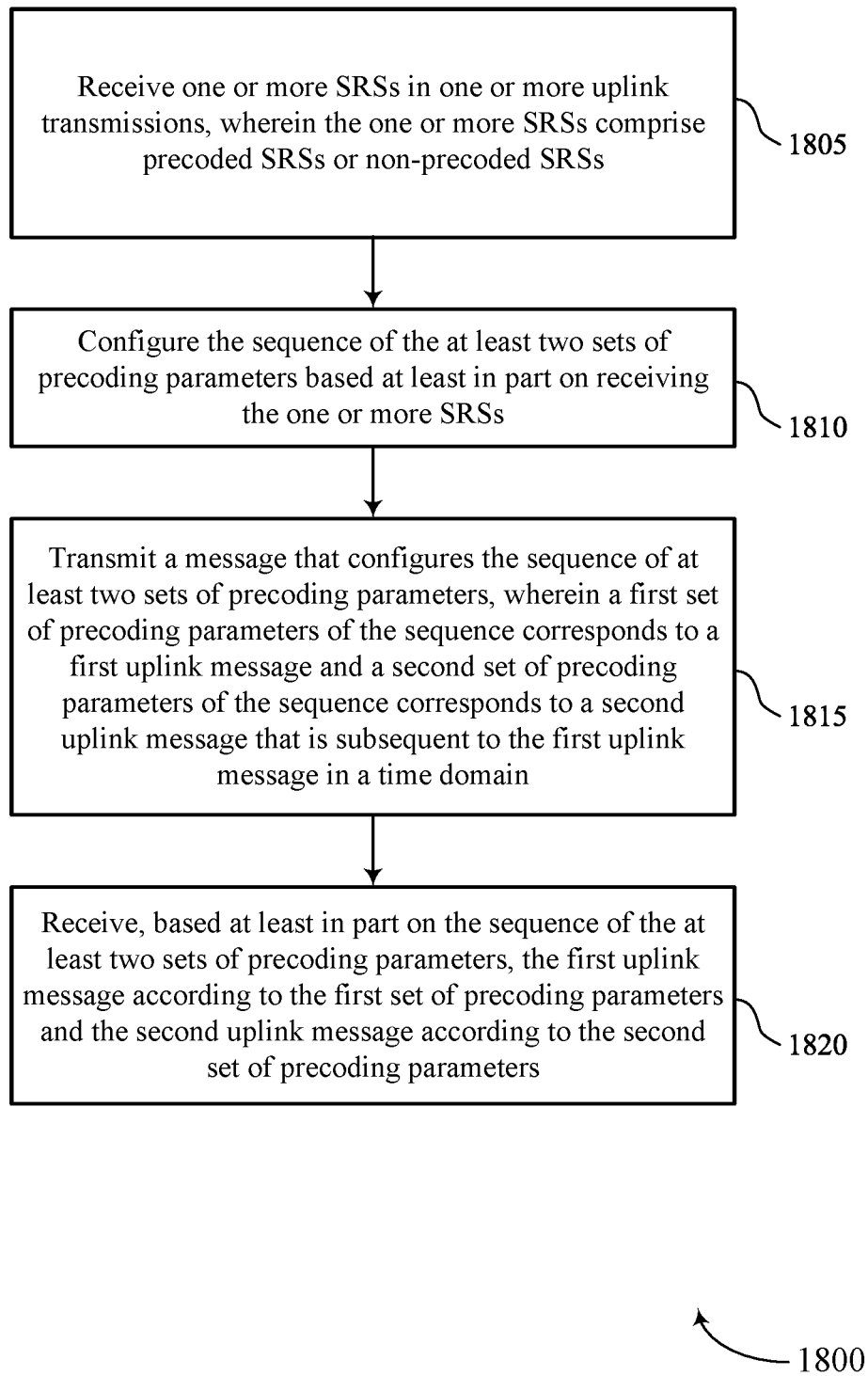

FIG. 18 shows a flowchart illustrating a method 1800 that supports network-indicated precoder sequence for uplink transmissions in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving one or more SRSs in one or more uplink transmissions, wherein the one or more SRSs comprise precoded SRSs or non-precoded SRSs. The operations of 1805 may be performed in accordance with examples as disclosed herein. In some examples, aspects of the operations of 1805 may be performed by a reference signal component 1335 as described with reference to FIG. 13.

At 1810, the method may include configuring the sequence of the at least two sets of precoding parameters based on receiving the one or more SRSs. The operations of 1810 may be performed in accordance with examples as disclosed herein. In some examples, aspects of the operations of 1810 may be performed by a parameter component 1325 as described with reference to FIG. 13.

At 1815, the method may include transmitting a message that configures the sequence of at least two sets of precoding parameters, where a first set of precoding parameters of the sequence corresponds to a first uplink message and a second set of precoding parameters of the sequence corresponds to a second uplink message that is subsequent to the first uplink message in a time domain. The operations of 1815 may be performed in accordance with examples as disclosed herein. In some examples, aspects of the operations of 1815 may be performed by a parameter component 1325 as described with reference to FIG. 13.

At 1820, the method may include receiving, based on the sequence of the at least two sets of precoding parameters, the first uplink message according to the first set of precoding parameters and the second uplink message according to the second set of precoding parameters. The operations of 1820 may be performed in accordance with examples as disclosed herein. In some examples, aspects of the operations of 1820 may be performed by a communication component 1330 as described with reference to FIG. 13.

The following provides an overview of aspects of the present disclosure:

Aspect 1: A method for wireless communication at a UE, comprising: receiving a message that indicates a sequence of at least two sets of precoding parameters, wherein a first set of precoding parameters of the sequence corresponds to a first uplink message and a second set of precoding parameters of the sequence corresponds to a second uplink message that is subsequent to the first uplink message in a time domain; and transmitting, based at least in part on the sequence of the at least two sets of precoding parameters, the first uplink message using the first set of precoding parameters and the second uplink message using the second set of precoding parameters.

Aspect 2: The method of aspect 1, further comprising: transmitting, prior to transmitting the first uplink message and the second uplink message, one or more SRSs in one or more uplink transmissions, wherein the sequence of the at least two sets of precoding parameters is based at least in part on the one or more SRSs, wherein the one or more SRSs comprise precoded SRSs or non-precoded SRSs.

Aspect 3: The method of any of aspects 1 through 2, further comprising: storing a list including a plurality of sets of precoding parameters, the list comprising the at least two sets of precoding parameters.

Aspect 4: The method of aspect 3, wherein the message indicates which sets of precoding parameters from the plurality of sets of precoding parameters from the list are included in the sequence.

Aspect 5: The method of any of aspects 3 through 4, wherein the list comprises a list of a previous N sets of precoding parameters used by the UE, N is a network-configured positive integer.

Aspect 6: The method of any of aspects 1 through 5, further comprising: storing a first list including sets of precoding parameters associated with narrow beam precoding; and storing a second list including sets of precoding parameters associated with wide beam precoding.

Aspect 7: The method of aspect 6, further comprising: selecting, for the first uplink message, the first set of precoding parameters from the first list or the second list based at least in part on receiving the message indicating the sequence of the at least two sets of precoding parameters; and selecting, for the second uplink message, the second set of precoding parameters from the first list or the second list based at list in part on receiving the message indicating the sequence of the at least two sets of precoding parameters.

Aspect 8: The method of aspect 7, wherein the message comprises at least two flags associated with the at least two sets of precoding parameters, wherein the at least two flags indicate whether a respective set of precoding parameters is associated with the first list or the second list, the method comprising: selecting the first set of precoding parameters from the first list based at least in part on a first flag indicating that the first set of precoding parameters is associated with the first list; and selecting the second set of precoding parameters from the second list based at least in part on a second flag indicating that the second set of precoding parameters is associated with the second list.

Aspect 9: The method of any of aspects 7 through 8, further comprising: storing a mapping between the first list and the second list, wherein selecting the second set of precoding parameters from the second list is based at least in part on the mapping.

Aspect 10: The method of any of aspects 1 through 9, wherein the first set of precoding parameters and the second set of precoding parameters comprise an SRI, a rank of an uplink transmission, a PMI, or a combination thereof.

Aspect 11: The method of any of aspects 1 through 10, further comprising: transmitting a set of uplink messages according to the sequence of the at least two sets of precoding parameters, the set of uplink messages comprising the first uplink message and the second uplink message.

Aspect 12: The method of any of aspects 1 through 11, further comprising: transmitting one or more SRSs based at least in part on receiving the message that indicates the sequence of the at least two sets of precoding parameters; receiving a second message that indicates one or more precoding parameters of the first set of precoding parameters, wherein transmitting the first uplink message comprises transmitting the first uplink message using the one or more precoding parameters of the first set of precoding parameters indicated in the second message.

Aspect 13: The method of any of aspects 1 through 11, further comprising: transmitting one or more SRSs based at least in part on receiving the message that indicates the sequence of the at least two sets of precoding parameters; receiving, based at least in part on transmitting the one or more SRSs, a second message that indicates to the UE to restart a precoding parameter selection procedure, wherein the second message configures a channel measurement resource for the precoding parameter selection procedure or requests transmission of a non-precoded SRS.

Aspect 14: The method of any of aspects 1 through 13, wherein the sequence of the at least two sets of precoding parameters corresponds to a set of scheduled uplink messages, a set of configured uplink messages, or a combination thereof.

Aspect 15: The method of any of aspects 1 through 14, wherein the message comprises a DCI message that schedules or releases a dynamic uplink grant or a configured uplink grant, a DCI message responsive to one or more SRSs transmitted by the UE, an RRC message, a MAC-CE message, or a combination thereof.

Aspect 16: A method for wireless communication at a base station, comprising: transmitting a message that configures a sequence of at least two sets of precoding parameters, wherein a first set of precoding parameters of the sequence corresponds to a first uplink message and a second set of precoding parameters of the sequence corresponds to a second uplink message that is subsequent to the first uplink message in a time domain; and receiving, based at least in part on the sequence of the at least two sets of precoding parameters, the first uplink message according to the first set of precoding parameters and the second uplink message according to the second set of precoding parameters.

Aspect 17: The method of aspect 16, further comprising: receiving, prior to receiving the first uplink message and the second uplink message, one or more SRSs in one or more uplink transmissions, wherein the one or more SRSs comprise precoded SRSs or non-precoded SRSs; and configuring the sequence of the at least two sets of precoding parameters based at least in part on receiving the one or more SRSs.

Aspect 18: The method of any of aspects 16 through 17, further comprising: identifying a list including a plurality of sets of precoding parameters, the list comprising the at least two sets of precoding parameters.

Aspect 19: The method of aspect 18, further comprising: configuring the sequence of the at least two sets of precoding parameters based at least in part on selecting the at least two sets of precoding parameters from the list.

Aspect 20: The method of any of aspects 16 through 19, further comprising: identifying a first list including sets of precoding parameters associated with narrow beam precoding parameters; and identifying a second list including sets of precoding parameters associated with wide beam precoding parameters.

Aspect 21: The method of aspect 20, wherein the message comprises a first flag indicating that the first set of precoding parameters is associated with the first list; and the message comprises a second flag indicating that the second set of precoding parameters is associated with the second list.

Aspect 22: The method of any of aspects 16 through 21, further comprising: refraining from transmitting a second message that configures the second set of precoding parameters based at least in part on transmitting the message that indicates the sequence of the at least two sets of precoding parameters.

Aspect 23: The method of any of aspects 16 through 22, wherein the first set of precoding parameters and the second set of precoding parameters comprise an SRI, a rank of an uplink transmission, a PMI, or a combination thereof.

Aspect 24: The method of any of aspects 16 through 23, further comprising: receiving a set of uplink messages according to the sequence of the at least two sets of precoding parameters, the set of uplink messages comprising the first uplink message and the second uplink message.

Aspect 25: The method of any of aspects 16 through 24, further comprising: receiving one or more SRSs based at least in part on receiving the message that indicates the sequence of the at least two sets of precoding parameters; selecting one or more precoding parameters of the first set of precoding parameters based at least in part on receiving the one or more SRSs; and transmitting a second message that configures the one or more precoding parameters of the first set of precoding parameters, wherein receiving the first uplink message comprises receiving the first uplink message according to the one or more precoding parameters of the first set of precoding parameters.

Aspect 26: The method of any of aspects 16 through 24, further comprising: receiving one or more SRSs based at least in part on receiving the message that indicates the sequence of the at least two sets of precoding parameters; transmitting, based at least in part on receiving the one or more SRSs, a second message that indicates a restart to a precoding parameter selection procedure, wherein the second message configures a channel measurement resource for the precoding parameter selection procedure or requests transmission of a non-precoded SRS.

Aspect 27: The method of any of aspects 16 through 26, wherein the sequence of the at least two sets of precoding parameters corresponds to a set of scheduled uplink messages, a set of configured uplink messages, or a combination thereof.

Aspect 28: The method of any of aspects 16 through 27, wherein the message comprises a DCI message that schedules or releases a dynamic uplink grant or a configured uplink grant, a DCI message responsive to one or more SRSs transmitted by the UE, an RRC message, a MAC-CE message, or a combination thereof.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a message that indicates a sequence of at least two sets of precoding parameters, wherein, for each set of precoding parameters, the sequence comprises a first value indicating a respective transmission interval and one or more second values indicating one or more respective precoders to use during the respective transmission interval, wherein a first set of precoding parameters of the sequence corresponds to a first uplink message and a second set of precoding parameters of the sequence corresponds to a second uplink message, the second uplink message being subsequent to the first uplink message in a time domain, and wherein first data associated with the first uplink message is different than second data associated with the second uplink message before application of the first set of precoding parameters and the second set of precoding parameters; and
transmitting, based at least in part on the sequence of the at least two sets of precoding parameters, the first uplink message using the first set of precoding parameters and the second uplink message using the second set of precoding parameters.

2. The method of claim 1, further comprising:
transmitting, prior to transmitting the first uplink message and the second uplink message, one or more sounding reference signals in one or more uplink transmissions, wherein the sequence of the at least two sets of precoding parameters is based at least in part on the one or more sounding reference signals, wherein the one or more sounding reference signals comprise precoded sounding reference signals or non-precoded sounding reference signals.

3. The method of claim 1, further comprising:
storing a list including a plurality of sets of precoding parameters, the list comprising the at least two sets of precoding parameters.

4. The method of claim 3, wherein the message indicates which sets of precoding parameters from the plurality of sets of precoding parameters from the list are included in the sequence.

5. The method of claim 3, wherein the list comprises a list of a previous N sets of precoding parameters used by the UE, wherein N is a network-configured positive integer.

6. The method of claim 1, further comprising:
storing a first list including sets of precoding parameters associated with narrow beam precoding; and
storing a second list including sets of precoding parameters associated with wide beam precoding.

7. The method of claim 6, further comprising:
selecting, for the first uplink message, the first set of precoding parameters from the first list or the second list based at least in part on receiving the message indicating the sequence of the at least two sets of precoding parameters; and
selecting, for the second uplink message, the second set of precoding parameters from the first list or the second list based at list in part on receiving the message indicating the sequence of the at least two sets of precoding parameters.

8. The method of claim 7, wherein the message comprises at least two flags associated with the at least two sets of precoding parameters, wherein the at least two flags indicate whether a respective set of precoding parameters is associated with the first list or the second list, the method comprising:
selecting the first set of precoding parameters from the first list based at least in part on a first flag indicating that the first set of precoding parameters is associated with the first list; and
selecting the second set of precoding parameters from the second list based at least in part on a second flag indicating that the second set of precoding parameters is associated with the second list.

9. The method of claim 7, further comprising:
storing a mapping between the first list and the second list, wherein selecting the second set of precoding parameters from the second list is based at least in part on the mapping.

10. The method of claim 1, wherein the first set of precoding parameters and the second set of precoding parameters comprise a sounding reference signal resource indicator, a rank of an uplink transmission, a precoding matrix indicator, or a combination thereof.

11. The method of claim 1, further comprising:
transmitting a set of uplink messages according to the sequence of the at least two sets of precoding parameters, the set of uplink messages comprising the first uplink message and the second uplink message.

12. The method of claim 1, further comprising:
transmitting one or more sounding reference signals based at least in part on receiving the message that indicates the sequence of the at least two sets of precoding parameters; and
receiving a second message that indicates one or more precoding parameters of the first set of precoding parameters, wherein transmitting the first uplink message comprises transmitting the first uplink message using the one or more precoding parameters of the first set of precoding parameters indicated in the second message.

13. The method of claim 1, further comprising:
transmitting one or more sounding reference signals based at least in part on receiving the message that indicates the sequence of the at least two sets of precoding parameters; and
receiving, based at least in part on transmitting the one or more sounding reference signals, a second message that indicates to the UE to restart a precoding parameter selection procedure, wherein the second message configures a channel measurement resource for the precoding parameter selection procedure or requests transmission of a non-precoded sounding reference signal.

14. The method of claim 1, wherein the sequence of the at least two sets of precoding parameters corresponds to a set of scheduled uplink messages, a set of configured uplink messages, or a combination thereof.

15. The method of claim 1, wherein the message comprises a downlink control information message that schedules or releases a dynamic uplink grant or a configured uplink grant, a downlink control information message responsive to one or more sounding reference signals transmitted by the UE, a radio resource control message, a medium access control-control element message, or a combination thereof.

16. A method for wireless communication at a network device, comprising:
transmitting a message that configures a sequence of at least two sets of precoding parameters, wherein, for each set of precoding parameters, the sequence comprises a first value indicating a respective transmission interval and one or more second values indicating one or more respective precoders to use during the respective transmission interval, wherein a first set of precoding parameters of the sequence corresponds to a first uplink message and a second set of precoding parameters of the sequence corresponds to a second uplink message, the second uplink message being subsequent to the first uplink message in a time domain, and wherein first data associated with the first uplink message is different than second data associated with the second uplink message before application of the first set of precoding parameters and the second set of precoding parameters; and
receiving, based at least in part on the sequence of the at least two sets of precoding parameters, the first uplink message according to the first set of precoding parameters and the second uplink message according to the second set of precoding parameters.

17. The method of claim 16, further comprising:
receiving, prior to receiving the first uplink message and the second uplink message, one or more sounding reference signals in one or more uplink transmissions, wherein the one or more sounding reference signals comprise precoded sounding reference signals or non-precoded sounding reference signals; and
configuring the sequence of the at least two sets of precoding parameters based at least in part on receiving the one or more sounding reference signals.

18. The method of claim 16, further comprising:
identifying a list including a plurality of sets of precoding parameters, the list comprising the at least two sets of precoding parameters.

19. The method of claim 18, further comprising:
configuring the sequence of the at least two sets of precoding parameters based at least in part on selecting the at least two sets of precoding parameters from the list.

20. The method of claim 16, further comprising:
identifying a first list including sets of precoding parameters associated with narrow beam precoding parameters; and
identifying a second list including sets of precoding parameters associated with wide beam precoding parameters.

21. The method of claim 20, wherein:
the message comprises a first flag indicating that the first set of precoding parameters is associated with the first list; and
the message comprises a second flag indicating that the second set of precoding parameters is associated with the second list.

22. The method of claim 16, further comprising:
refraining from transmitting a second message that configures the second set of precoding parameters based at least in part on transmitting the message that indicates the sequence of the at least two sets of precoding parameters.

23. The method of claim 16, wherein the first set of precoding parameters and the second set of precoding parameters comprise a sounding reference signal resource indicator, a rank of an uplink transmission, a precoding matrix indicator, or a combination thereof.

24. The method of claim 16, further comprising:
receiving a set of uplink messages according to the sequence of the at least two sets of precoding parameters, the set of uplink messages comprising the first uplink message and the second uplink message.

25. The method of claim 16, further comprising:
receiving one or more sounding reference signals based at least in part on receiving the message that indicates the sequence of the at least two sets of precoding parameters;
selecting one or more precoding parameters of the first set of precoding parameters based at least in part on receiving the one or more sounding reference signals; and transmitting a second message that configures the one or more precoding parameters of the first set of precoding parameters, wherein receiving the first uplink message comprises receiving the first uplink message according to the one or more precoding parameters of the first set of precoding parameters.

26. The method of claim 16, further comprising:
receiving one or more sounding reference signals based at least in part on receiving the message that indicates the sequence of the at least two sets of precoding parameters; and
transmitting, based at least in part on receiving the one or more sounding reference signals, a second message that indicates a restart to a precoding parameter selection procedure, wherein the second message configures a channel measurement resource for the precoding parameter selection procedure or requests transmission of a non-precoded sounding reference signal.

27. The method of claim 16, wherein the sequence of the at least two sets of precoding parameters corresponds to a set of scheduled uplink messages, a set of configured uplink messages, or a combination thereof.

28. The method of claim 16, wherein the message comprises a downlink control information message that schedules or releases a dynamic uplink grant or a configured uplink grant, a downlink control information message responsive to one or more sounding reference signals, a radio resource control message, a medium access control-control element message, or a combination thereof.

29. An apparatus for wireless communication at a user equipment (UE), comprising:
a processor;
memory coupled with the processor; and
instructions stored in the memory and executable by the processor to cause the apparatus to:
receive a message that indicates a sequence of at least two sets of precoding parameters, wherein, for each set of precoding parameters, the sequence comprises a first value indicating a respective transmission interval and one or more second values indicating one or more respective precoders to use during the respective transmission interval, wherein a first set of precoding parameters of the sequence corresponds to a first uplink message and a second set of precoding parameters of the sequence corresponds to a second uplink message, the second uplink message being subsequent to the first uplink message in a time domain, and wherein first data associated with the first uplink message is different than second data associated with the second uplink message before application of the first set of precoding parameters and the second set of precoding parameters; and
transmit, based at least in part on the sequence of the at least two sets of precoding parameters, the first uplink message using the first set of precoding parameters and the second uplink message using the second set of precoding parameters.

30. An apparatus for wireless communication at a network device, comprising:
a processor;
memory coupled with the processor; and
instructions stored in the memory and executable by the processor to cause the apparatus to:
transmit a message that configures a sequence of at least two sets of precoding parameters, wherein, for each set of precoding parameters, the sequence comprises a first value indicating a respective transmission interval and one or more second values indicating one or more respective precoders to use during the respective transmission interval, wherein a first set of precoding parameters of the sequence corresponds to a first uplink message and a second set of precoding parameters of the sequence corresponds to a second uplink message, the second uplink message being subsequent to the first uplink message in a time domain, and wherein first data associated with the first uplink message is different than second data associated with the second uplink message before application of the first set of precoding parameters and the second set of precoding parameters; and
receive, based at least in part on the sequence of the at least two sets of precoding parameters, the first uplink message according to the first set of precoding parameters and the second uplink message according to the second set of precoding parameters.

* * * * *